(12) United States Patent
Norridge et al.

(10) Patent No.: US 12,515,383 B2
(45) Date of Patent: Jan. 6, 2026

(54) APPARATUS, METHOD AND CAPACITOR PLATE FOR PRODUCING A PARTICLE FOAM PART

(71) Applicant: adidas AG, Herzogenaurach (DE)

(72) Inventors: Marc Norridge, Fuerth (DE); Bastian Gothe, Erlangen (DE); Jarkko Siltamäki, Fuerth (DE); Victor Romanov, Wertheim (DE); Constantin Kemmer, Marktheidenfeld (DE)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 17/730,748

(22) Filed: Apr. 27, 2022

(65) Prior Publication Data
US 2022/0347894 A1 Nov. 3, 2022

(30) Foreign Application Priority Data

Apr. 28, 2021 (DE) .......................... 102021204230.9

(51) Int. Cl.
*B29C 43/00* (2006.01)
*B29C 43/36* (2006.01)
(Continued)

(52) U.S. Cl.
CPC .......... *B29C 43/006* (2013.01); *B29C 43/003* (2013.01); *B29C 43/36* (2013.01);
(Continued)

(58) Field of Classification Search
CPC ..... B29C 43/006; B29C 43/003; B29C 43/36; B29C 43/52; B29C 67/205; B29C 45/73;
(Continued)

(56) References Cited

U.S. PATENT DOCUMENTS 3,079,723 A 3/1963 Roes
3,242,238 A 3/1966 Edberg et al.
(Continued)

FOREIGN PATENT DOCUMENTS

CN 102358016 * 2/2012 ............. B29C 45/73
DE 102015202013 8/2016
(Continued)

OTHER PUBLICATIONS

German Patent Application No. 102021204230.9, Office Action mailed Jan. 31, 2022, 10 pages (English machine translation provided).
(Continued)

*Primary Examiner* — John J DeRusso
*Assistant Examiner* — Shibin Liang
(74) *Attorney, Agent, or Firm* — Kilpatrick Townsend & Stockton LLP

(57) ABSTRACT

The invention relates to an apparatus and a method for the manufacture of a shoe sole or part of a shoe sole from foam particles. Disclosed is an apparatus for the manufacture of a shoe sole or part of a shoe sole from foam particles, wherein the apparatus comprises: a.) a molding tool which is formed from at least two molding halves and which defines a molding cavity, and b.) at least two capacitor plates which are arranged adjacent to the molding cavity, wherein c.) at least one of the capacitor plates is connected to a radiation source, and wherein d.) at least one of the capacitor plates comprises several segments that have an adaptable distance to the molding cavity. Also disclosed is method for using such an apparatus in the manufacture of a shoe sole or part of a shoe sole from foam particles.

16 Claims, 13 Drawing Sheets

(51) Int. Cl.
    *B29C 43/52*      (2006.01)
    *B29C 67/20*      (2006.01)
    *B29D 35/00*      (2010.01)
    *B29D 35/12*      (2010.01)
    *B29L 31/50*      (2006.01)

(52) U.S. Cl.
    CPC ............ *B29C 43/52* (2013.01); *B29C 67/205* (2013.01); *B29D 35/0063* (2013.01); *B29D 35/122* (2013.01); *B29L 2031/504* (2013.01)

(58) Field of Classification Search
    CPC ........ B29C 2035/0811; B29D 35/0063; B29D 35/122; B29L 2031/504
    See application file for complete search history.

(56) References Cited

U.S. PATENT DOCUMENTS

| | | | | |
|---|---|---|---|---|
| 8,480,823 | B1* | 7/2013 | Matsen | .................. B29C 70/54 148/692 |
| 2013/0312474 | A1* | 11/2013 | Dykstra | ............... B21D 22/022 72/60 |
| 2019/0090581 | A1 | 3/2019 | Holmes et al. | |
| 2020/0307041 | A1* | 10/2020 | Reuber | ............... B29C 44/3415 |
| 2021/0206037 | A1* | 7/2021 | Romanov | ............. B29C 44/445 |
| 2022/0161508 | A1* | 5/2022 | Kuntz | .................... B29C 43/36 |

FOREIGN PATENT DOCUMENTS

| | | | | |
|---|---|---|---|---|
| DE | 102016100690 | | 7/2017 | |
| DE | 102016123214 | | 6/2018 | |
| DE | 102016223980 | | 6/2018 | |
| DE | 102018217017 | * | 4/2020 | ............ B29C 70/42 |
| DE | 102019127680 | | 4/2021 | |
| FR | 1484844 | A | 6/1967 | |
| GB | 1403326 | | 8/1975 | |
| JP | S47-025457 | B | 7/1972 | |
| JP | S60-217122 | A | 10/1985 | |
| JP | H03-109808 | U | 11/1991 | |
| JP | 2017-159558 | A | 9/2017 | |
| WO | 2001/064414 | | 9/2001 | |
| WO | 2010/037028 | A1 | 4/2010 | |
| WO | 2013/050181 | | 4/2013 | |
| WO | 2017050943 | * | 7/2017 | |
| WO | 2018/099833 | A1 | 6/2018 | |
| WO | 2018100154 | * | 6/2018 | |

OTHER PUBLICATIONS

European Extended Search Report, European Patent Application No. 22170190.7, Sep. 21, 2022, 9 pages.
Office Action, Chinese Patent Application No. 202210453545.2, Jun. 5, 2024, 18 pages.
Office Action, Japanese Patent Application No. 2022-073805, Aug. 29, 2023 , 6 pages.
Office Action , German Patent Application No. 10 2021 204 230.9, Feb. 5, 2024 , 8 pages.
Office Action, Japanese Patent Application No. 2024-040911, Sep. 3, 2024, 10 pages.
European Extended Search Report, European Patent Application No. 25175914.8, Aug. 18, 2025, 10 pages.
Office Action, Japanese Patent Application No. 2024-040911, Feb. 4, 2025, 6 pages.

* cited by examiner

APPARATUS, METHOD AND CAPACITOR PLATE FOR PRODUCING A PARTICLE FOAM PART

CROSS REFERENCE TO RELATED APPLICATIONS

This application is related to and claims priority benefits from German Patent Application No. 102021204230.9, filed Apr. 28, 2021 ("the '203 application). The '203 application is hereby incorporated herein in its entirety by this reference.

FIELD OF THE INVENTION

The invention relates to an apparatus, a process and a capacitor plate set for producing a particle foam part.

The apparatus, the method and the capacitor plate set are provided for producing the particle foam part by using electromagnetic waves, whereby foam particles are welded into the particle foam part by means of the electromagnetic waves. The energy required for welding is applied to the foam particles by means of the electromagnetic waves.

The apparatus, the method and the capacitor plate set can in particular be used in the manufacture of a shoe sole or part of a shoe sole, particularly a midsole or part thereof. The invention also relates to a shoe sole or part of a shoe sole, in particular a midsole or part of a midsole, manufactured in this manner.

BACKGROUND

In U.S. Pat. No. 3,079,723 a process for sintering moist thermoplastic foam particles is described. The particles are dielectrically heated and simultaneously compressed. Electromagnetic waves with a frequency of about 2 to 1000 MHz are applied.

Document U.S. Pat. No. 3,242,238 describes a similar procedure. In this process, foam particles are moistened with an aqueous solution and exposed to an electromagnetic field with a frequency of about 5 to 100 MHz.

Document GB1403326 describes a process for welding expandable polystyrene foam particles. In this process particles are moistened with an aqueous solution and exposed to an electromagnetic field of 5 to 2000 MHz.

WO01/64414A1 discloses a process in which polymer particles of polyolefins, which are wetted with a liquid medium, are heated with electromagnetic waves, in particular microwaves. The temperature in the mold is controlled by controlling the pressure in the mold.

WO2013/050181A1 describes a process for producing particle foam parts in which a mixture of foam particles and dielectric transfer liquid is heated by means of electromagnetic waves to fuse the foam particles into a particle foam part. Radio waves or microwaves are used as electromagnetic waves. The material of the foam particles is formed from polypropylene (PP).

In spite of these considerable efforts, which have been ongoing for a long time, no machines with which foam particles are welded by means of electromagnetic waves have so far become established in industrial production. One of the main reasons for this is that the heat cannot be uniformly introduced into the foam particles, and does not result in an even welding within the particle foam part.

In commercial use, therefore, machines that weld the foam particles by using steam have been used primarily up to now. However, these machines have the disadvantage that the energy input is inefficient. Furthermore, the particle foam parts are still moist after welding and can therefore not be further processed immediately. As the heating is done from the outside towards the inside, the interior part of the component cannot always be welded with sufficient quality. In addition, the devices for generating steam are much more expensive than a generator for electromagnetic waves.

Welding foam particles with electromagnetic radiation requires a high energy provision to the foam particles, which are located in a molding tool for this purpose. In addition, the energy input into the foam particles should be as uniform as possible in order to achieve uniform heating and thus uniform welding of the foam particles.

One problem is that the electrodes and the corresponding molding tool are usually of different sizes. The molding tool has to be exchanged depending on the product to be produced. Therefore, different molding tools are used in a fixture, which may differ in size. The molding tool is usually a bit smaller than the electrode, in order to accommodate the molding tool completely within the electric field of the plate capacitor. The electrode therefore usually protrudes a little to the side of the molding tool. This creates an electric field that is not used. The capacitance of the capacitor is greater than necessary. As a result, the capacitor takes up more charge and thus also more energy than necessary.

Another problem particularly with regard to the production of shoe soles or parts of shoe soles, in particular midsoles or parts thereof, is the complex three-dimensional geometry of such parts. For example, shoe soles almost never have a constant thickness along their longitudinal and/or medial-to-lateral extension. This complicates the welding process in that it is hard to achieve a constant and homogeneous welding of the particles throughout all regions of the sole.

SUMMARY

In some aspects, the present disclosure is directed to an apparatus for the manufacture of a shoe sole or part of a shoe sole from foam particles, wherein the apparatus comprises: a molding tool formed from at least two molding halves which defines a molding cavity; at least two capacitor plates arranged adjacent to the molding cavity; wherein at least one of the capacitor plates is connected to a radiation source; and wherein at least one of the capacitor plates comprises several segments having an adaptable distance to the molding cavity. The segments may be electrically connected to an electrically conductive electrode main body. The electrically conductive main body may be on ground potential. The capacitor plate connected to the radiation source may be a first capacitor plate on one side of the molding cavity, and wherein the capacitor plate comprising several segments having an adaptable distance to the molding cavity may be a second capacitor plate on an opposite side of the molding cavity. The distance of the segments to the molding cavity may be individually adjusted by mechanical and/or electrical actuator means. The segments may be arranged in a two-dimensional grid. The grid density may vary locally. The segments may be provided as screws or pins adjustably connected to the electrically conductive main body. The screws may be metal screws that are screwed into the electrically conductive main body, and wherein the electrically conductive main body may be made from metal or comprise metal. The apparatus may further comprise a cover sheet of electrically non-conductive material which is arranged on the electrically conductive main body and comprises openings in which the screws or pins are arranged. The cover sheet may be made from or comprise an electrically insulating cover. The cover sheet may be made from or comprise at least one of the following materials: polytetrafluoroethylene, PTFE; polyethylene, PE, especially ultra-high molecular weight polyethylene, UHMWPE; polyether ketone, PEEK; a thermoplast; a duroplast; polyethylene terephthalate, PET; polyoxymethylene, POM; polystyrene, PS; an insulating mineral material. Each of the segments may be set to one of at least the following four positions: 1) removed or electrically disconnected, 2) a low position, 3) a medium position, or 4) a high position. The position of the segments may be adjusted while the molding cavity is irradiated with electromagnetic radiation. Adjusting the position of at least one of the segments may influence the field strength distribution of the radiated electromagnetic field within the molding cavity. The shape of the capacitor plate that is connected to the radiation source may be at least partially adapted to the geometry of the part that is to be manufactured.

In some aspects, the present disclosure is directed to a method for the manufacture of a shoe sole or part of a shoe sole from foam particles, the method comprising: loading the particles into a molding cavity of a molding tool which is formed from at least two molding halves which define the molding cavity, wherein at least two capacitor plates are arranged adjacent to the molding cavity, wherein at least one of the capacitor plates is connected to a radiation source, and wherein at least one of the capacitor plates comprises several segments that have an adaptable distance to the molding cavity; irradiating the molding cavity with electromagnetic radiation emitted by the capacitor plates; and locally adjusting a field strength distribution of the irradiating electromagnetic field within the molding cavity by modifying the adaptable distance of the segments to the molding cavity. The modifying may occur before and/or during irradiation of the molding cavity with the electromagnetic radiation. The foam particles may comprise at least one of the following base materials: thermoplastic polyurethane, TPU; polylactate, PLA; polyamide, PA; polyether block amide, PEBA; polyethylene terephthalate, PET; polybutylene terephthalate, PBT; thermoplastic polyester ether elastomer, TPEE.

BRIEF DESCRIPTION OF THE DRAWINGS

In the following detailed description, embodiments of the invention are described referring to the following figures.

BRIEF DESCRIPTION

Figure 1:
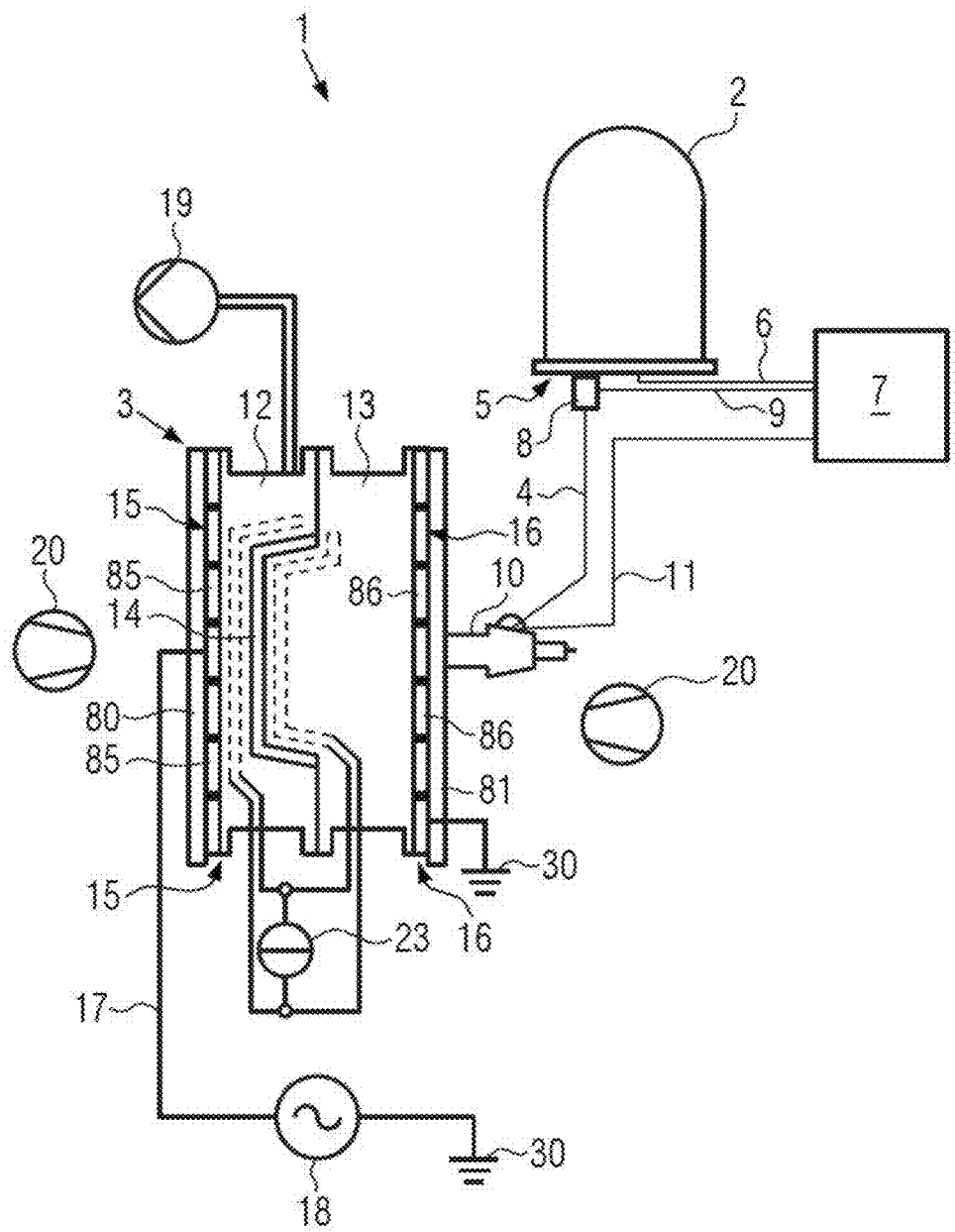
FIG. 1 schematically shows an example of a device for manufacturing a particle foam part.

The applicant of the present patent application has improved known devices and methods for welding foam particles by means of electromagnetic waves and the corresponding processes, particularly in the context of the manufacture of shoe soles. These devices and processes are based on the technology described in the published documents DE102016100690A1, DE102016123214A1, and DE102019127680, as well as the published applications DE102015202013A1 and DE102016223980A1 owned by the applicant of the present application, to which reference is made in connection with the invention as described below, in particular with respect to the devices, processes, and materials, but not exclusively.

The present invention is, in particular, based on the problem of increasing the efficiency of the energy input and of using the electric field more effectively in the production of particle foam parts, particularly shoe soles/midsoles, by welding foam particles by means of electromagnetic waves.

The invention is further based on the problem of increasing the quality of shoe soles or midsoles produced by fusing foam particles by use of electromagnetic fields, even if they have a complex three-dimensional geometry and, in particular, a varying thickness.

These problems are addressed and at least partially solved by the different aspects of the invention as discussed in more detail below.

A first aspect of the invention is provided by an apparatus for the production of a particle foam part, particularly a shoe sole or part of a shoe sole (e.g., a midsole or part thereof).

In an embodiment, the apparatus comprises a molding tool which defines a molding cavity, wherein at least two capacitor plates are arranged adjacent to the molding cavity, which are connected to a radiation source for electromagnetic radiation, wherein the electromagnetic radiation source is adapted to emit electromagnetic radiation, and the molding tool is formed from at least two molding halves, wherein at least one of the two capacitor plates is formed from several segments, so that the surface of the capacitor plate array with the several segments may be adapted based on the shape of the product to be fused within the molding cavity.

For example, the capacitor plate formed from segments is designed as a segmented electrode. It may be composed of several segments. This is relatively easy to achieve, especially with a flat electrode or capacitor plate. However, it is not only possible with flat electrodes, but also with contoured electrodes, such as electrodes for the production of shoe soles/midsoles.

For example, the segments are shaped in such a way that by removing and/or adding the individual segments to form the capacitor plate, its surface may be adapted in its shape and size, and especially in its lateral dimensions, to the shape of the part to be produced in the molding tool.

In some embodiments, the segments of the capacitor plate are detachably connected electrically and mechanically. In this way, individual segments may be removed or added in order to adapt the surface of the capacitor plate to the size of the molding tool.

An electrically conductive connecting element is can provided, which electrically connects two or more segments at their edges. For example, electrically conductive metal elements such as copper or brass foils may be used, against which the edges of the segments of the electrodes are clamped so that there is an electrical connection to all segments of the electrodes.

Also, the segments can have areas at their edges that interlock when the segments are joined together. This means that the electrical and mechanical connection may be made particularly reliably and relatively cheaply at the segment joints. The edges or areas may be designed for this purpose, for example, as a stepped seam.

On the other hand, the segments can also be provided in a non-interlocking manner, in particular without such interlocking areas, which may be beneficial to allow in-mold-assembly, i.e. assembly of the segments (or addition or removal of a segment or segments) without having to dismantle the molding tool/capacitor plates.

In some embodiments, the segments are detachably attached to an insulator. The insulator serves to hold the segments in place. The insulator is, in some embodiments, suitable for high voltage and does not cause significant losses in RF radiation, otherwise it would heat up. Also, the used material should not display meaningful reaction to the electromagnetic field that is used in terms of its field permittivity and dielectric loss, since this would again lead to unwanted heat up. Therefore, a dielectric material with, in some embodiments, a low dielectric loss factor as well as a low dielectric permittivity is preferred. For example, a ceramic material and/or a plastic material may be used. Example dielectrics polymers that may be used include: PEEK, PTFE, PE, PS, PET. Example ceramic materials that may be used include: aluminum oxide, aluminum nitride, aluminum silicates.

The segments of the electrode or capacitor plate may be attached to the insulator, for example with screws. However, other means of fastening, such as plug connections, bolts, clamping elements, etc., can also be used to fasten the segments to the insulator.

For example, at least one segment of the capacitor plate formed by the segments is electrically connected to the radiation source.

According to one option, the segments of the capacitor plate may be permanently attached to an insulator and may be switched on or off individually to adjust the size of the capacitor plate. This may be done relatively easily, especially if the segmented capacitor plate is flat, or if two flat segmented capacitor plates form the capacitor for the exposure of the particles to radiation.

In this case, the segments are preferably electrically isolated from each other and each segment is separately connected to the radiation source, for example via a high-frequency line in case a high-frequency generator is used as radiation source.

Beneficially, the segments are each connected to a tunable resonant circuit and may be switched on or off, or activated or deactivated, individually or in groups, by tuning the respective resonant circuit.

In particular, the segments may each form a partial capacitor, which is connected to the tunable resonant circuit.

Each supply line may be assigned a regulating capacitor with which the energy supplied via the respective line may be adjusted independently of each other. By controlling the energy supply on the individual lines, it is thus possible to control which segment(s) of the capacitor is operated. By switching individual segments on and off by means of resonant circuit tuning, the size of the capacitor plate may be adapted to the size of the molding tool with regard to its radiation-emitting surface. This means that it is not necessary to mechanically remove or attach individual segments depending on the molding tool in order to adapt the surface of the capacitor plate.

In some embodiments, the segments together form a contoured capacitor plate.

In particular, the segments may be arranged on both sides of the molding cavity and, in particular, form a segmented capacitor plate there.

The segments can also be arranged on only one side of the molding cavity and form a segmented capacitor plate there. On the other side of the molding cavity, for example, a continuous capacitor plate may be arranged.

Also, on the other side of the molding cavity an electrically conductive area of the molding tool or an electrically conductive molding half can serve as a capacitor plate opposite the segmented capacitor plate. However, in the case of a contoured surface, an electrically nonconductive molding half is used in some embodiments, as it is easier to create a homogeneous electrical field. Moreover, using an electrically conduction molding half would entail the risk of burning the manufactured component in the regions adjacent to this molding half, so also from this perspective a non-conducting material is used, in some embodiments.

If both molding halves were electrically conductive, one molding half would have to be connected to an RF line of radiation, which would be relatively difficult or very costly to accomplish.

It is beneficial if at least one of the capacitor plates formed from the segments is electrically connected to the radiation source, while for example the other capacitor plate or its segments are electrically grounded or connected to earth.

In particular, the segments can each have a geometry which, when the segments are combined, produces a capacitor plate whose geometry (particularly, its lateral extension) is adapted to the geometry and size of the molding tool. For example, the segments may be rectangular, in some embodiments in different dimensions, in order to form differently sized rectangles as capacitor plates by combining several segments depending on the size of the molding tool to be irradiated.

The edges of adjacent segments are beneficially parallel to each other to form the capacitor plate by combining several segments.

In particular, it is beneficial to arrange the individual segments in such a way that a central square segment is provided and additional segments extend along the sides of the square segment. In this way, rectangles of different sizes may be created by combining several segments. A further ring of additional segments may be provided.

The segments can, for example, be designed as sheet metal parts. The segments may be flexible. It is beneficial if they are made of a metal with good electrical conductivity or a metal alloy with good electrical conductivity.

According to a second aspect of the invention, a capacitor plate set is provided for an apparatus for manufacturing a particle foam part, in particular a shoe sole or part of a shoe sole (e.g., a midsole or part thereof).

In an embodiment, the capacitor plate set comprises at least one first capacitor plate segment adapted to be attached to an insulator and comprising a terminal area adapted to be connected to a radiation source for generating electromagnetic radiation, at least one at least one second capacitor plate segments, wherein the first capacitor plate segment and the second capacitor plate segments are adapted to jointly form a capacitor plate whose area is adaptable in size to the size of a molding tool for producing the particle foam part.

The capacitor plate segments form a set of several objects belonging together to form at least one or also several segmented capacitor plates which are adaptable in their size to the size of the molding tool used to weld to the foam particles for manufacturing the particle foam part.

In some embodiments, the capacitor plate segments are detachably electrically and mechanically connectable.

In particular, the second capacitor plate segments may also each include a terminal area for connection to a radiation source for generating electromagnetic radiation.

Each capacitor plate segment may be designed in such a way that it is electrically isolated from the other capacitor plate segments in the capacitor plate formed from it and may be connected or disconnected from the energy source, e.g., by a tunable resonant circuit.

In some embodiments, the capacitor plate set is designed for use in an apparatus according to one of the aspects of the invention.

A third aspect of the invention relates to a process for the production of a particle foam part, in particular a shoe sole or part of a shoe sole (e.g. a midsole or part thereof).

In an embodiment, the method comprises the following steps: a.) filling foam particles into a molding cavity of a molding tool, wherein at least two capacitor plates are arranged adjacent to the molding cavity, which are electrically connected to a radiation source for electromagnetic radiation in order to generate electromagnetic radiation; b.) welding of the foam particles by the electromagnetic radiation between the capacitor plates; and c.) demolding; wherein d.) at least one of the two capacitor plates is formed from a plurality of segments, and the area of the at least one capacitor plate is adapted to the size of the molding tool by combining the radiation-generating segments.

The foam particles are heated in the molding tool so that they are welded to form to the particle foam part. Heat is applied to the foam particles using electromagnetic RF radiation.

It is beneficial to detachably connect the segments electrically and mechanically in order to combine them.

According to one option, the segments may be arranged electrically isolated from each other and, e.g., by tuning an resonant circuit connected to a respective segment, may be switched on or off to combine them. This allows the area of the capacitor plate emitting the radiation to be adjusted without having to mechanically remove or mechanically add segments. In particular, this eliminates the need to mechanically separate or connect segments to the radiation source when adjusting the area of the capacitor plate, which would require a great deal of effort.

In particular, the segments can each form a partial capacitor.

It is beneficial to use an apparatus according to the invention and/or a capacitor plate set according to the invention to carry out the described process.

The foam particles are, in some embodiments, made of, or comprise, expanded thermoplastic materials, especially thermoplastic polyurethane (TPU), polylactate (PLA), polyamide (PA), polyether block amide (PEBA), polyethylene terephthalate (PET), polybutylene terephthalate (PBT), or thermoplastic polyester ether elastomer (TPEE). The foam particles may also be a bead containing multiple polymer types in one foam particle or the foam particles may be a mixture of different particles of different foam polymers or combinations thereof. In some embodiments, the foam particles consist of 90% by weight of one or a mixture of these materials. These foam particles are particles that comprise a so-called bead foam, also known in the art as a pellet/particle foam. Often the foams derived from the use of connected foam particles are given the designation "e" to denote the bead form of the polymer foam component, for example, eTPU.

The foam particles from these materials are, in some embodiments, heated mainly by direct absorption of RF radiation. This means that the heat is not or only to a small extent heated by a heat-transferring medium, such as water, which absorbs the RF radiation and transfers it to the foam particles. On the one hand, the direct absorption of RF radiation is very efficient and also allows the welding of foam particles made of materials such as polyethylene terephthalate (PET), whose softening temperature is above 200° C. (usually around 260° C.), which is not possible by heating with an aqueous heat transfer medium. In addition, the use of such heat transfer agents may be avoided or reduced, thus improving the quality of the end product.

The addition of a heat transfer medium is also possible within the scope of the present invention, however.

The electromagnetic RF radiation, in some embodiments, has a frequency of at least 30 kHz or at least 0.1 MHz, in particular at least 1 MHz or at least 2 MHz, in some embodiments, at least 10 MHz. The maximum frequency may be 300 MHz. Specific (center) frequencies that may be used, and for which radiation sources are easily commercially available, are, for example, 6.78 MHz, 13.56 MHz, 27.12 MHz, 40.68 MHz. However, even (center) frequencies of 2.45 GHz or 5.8 GHz may potentially be used.

To generate the electromagnetic RF radiation, the capacitor plates are, in some embodiments, arranged on the molding tool which is otherwise made of an electrically insulating material. A high-frequency voltage with an amplitude of about at least 1 kV up to some kV, in some embodiments, at least 10 kV and in particular at least 20 kV is applied to the capacitor plates.

With such electrical voltages, a power in the range of 10 kW to 60 kW may be transferred to the foam particles in the molding cavity. This allows even large-volume particle foam parts, and/or shoe soles or parts thereof, to be reliably produced with very short cycle times of about 30 seconds to 2 minutes.

The foam particles may be compressed in the molding tool. The molding tool may be designed as a crack gap molding tool, for example. In it, the foam particles are mechanically compressed in addition to the compression effect created by their thermal expansion during the welding process.

The molding tool is, in some embodiments, made of a material that is essentially transparent (e.g., in the sense of a low relative permittivity) to the electromagnetic RF radiation that is used. Possible materials include polytetrafluoroethylene (PTFE), polyethylene (PE), especially ultra-high molecular weight polyethylene (UHMWPE), polyether ketone (PEEK). Also semi-transparent material may be used, however, like polyethylene terephthalate (PET), polyoxymethylene (POM), or polyketone (PK).

In the case that the segments may be connected or disconnected individually or in groups to form the capacitor, the electromagnetic radiation source may be designed as part of a generator resonant circuit. Lines for guiding the electromagnetic waves form a tool resonant circuit together with a pair of segments each forming a partial capacitor. By changing an inductance or a capacitance, the tool resonant circuit may be tuned and forms a tunable resonant circuit, through which the transmission of power may be blocked or enabled in a targeted manner.

A control device for controlling the tunable resonant circuit may be designed in such a way that the power supply from the generator resonant circuit to the tool resonant circuit, which may be designed as a tunable resonant circuit, may be switched on or enabled or interrupted by its tuning. In this way, the relevant segment is added to or removed from the capacitor plate formed from several segments which applies electromagnetic radiation to the molding tool during the welding process.

The power that may be transmitted into the molding cavity by means of tuning the resonant circuit may be in the range of 25 kW to 60 kW, depending on the dimensioning of the generator and the lines with which the generator resonant circuit(s) is connected to the tunable resonant circuit(s).

One of the two capacitor plates may be electrically connected to ground in all options of the different aspects of the invention discussed herein. The other capacitor plate may be directly connected to the radiation source either directly or through at least one of its segments, whereby the radiation is fed to this capacitor plate as electromagnetic waves relative to ground.

A fourth aspect of the present invention, which may be combined with the above-discussed first, second and/or third aspect of the invention and all their possible options, modifications and embodiments (if not ruled out physically or technically, of course), is provided by an apparatus for the production of a particle foam part, particularly a shoe sole or part of a shoe sole (e.g., a midsole or part of a midsole).

In an embodiment, the apparatus comprises: a.) a molding tool which is formed from at least two molding halves and which defines a molding cavity; b.) at least two capacitor plates which are arranged adjacent to the molding cavity; wherein c.) at least one of the capacitor plates is connected to a radiation source; and wherein d.) at least one of the capacitor plates comprises several segments that have an adaptable distance to the molding cavity.

We point out that the capacitor plates being arranged "adjacent" to the molding cavity does not mean that the capacitor plates are in direct contact with, or form the walls of the molding cavity. Rather, what is implied by the feature is that the capacitor plates are arranged "around" the molding cavity and at a distance therefrom that allows flooding or irradiating the molding cavity with an alternating electromagnetic field that is suitable to create the desired welding of the foam particles within the molding cavity. Typically, components or parts of, e.g., the molding tool (in particular, parts which are transparent or largely transparent to the used electromagnetic radiation) will be arranged between the capacitor plates and the molding cavity (see, for example, the detail discussion of possible embodiments with regard to the figures in the sections below), and the shape and dimensions of the molding cavity are defined by the molding tool, rather than the capacitor plates themselves (which makes it generally possible to use different molding tools with different molding cavities between the same set of capacitor plates).

In the disclosed apparatus, the multiple segments (also called "electrode elements" in the following) are designed in a manner that allows for manual or automatic shape changes of the respective capacitor plate (also referred to as an "electrode" in the following). These shape changes are used to locally control the electric field strength within the molding cavity, and therefore control the material heating in that location, as will be further explained in more detail below. This modularity brings both manufacturing and product benefits.

Former efforts in mold development were focused on sophisticated electrode design, guided by exact simulation, with the goal of trying to match the electromagnetic field inside the molding cavity as closely as possible to the desired values by the design of the electrodes/capacitor plates directly. Since particle fusion by means of electromagnetic radiation (in particular RF radiation) is based on dielectric heating of the target materials, the homogeneity of the heating is dependent on an even electric field distribution at the working frequency. The field is typically created between (at least) two conductive electrodes/capacitor plates, an active one and a grounded one, between which an insulating molding tool and the target part (here: a shoe sole or part thereof) are sitting. Commonly, the conductive metal electrodes/capacitor plates are partially shaped to adjust the field distribution to the disturbances caused by the molding tool and the part that is being molded. If this shaping is not correct, multiple parts of the tooling must be change to optimize the electrode design. Also, the electrode shape cannot be changed during the process, or between process loops to adapt to changed product requirements or material variations.

The disclosed apparatus, by contrast, allows for flexible changes of the tooling setup, in particular regarding the distance between the active and passive electrodes/capacitor plates, and particularly on a grid resolution. The change may be manual or active, depending on the chosen actuation. The change be fixed for the part that is currently being manufacture, or be changed even during the process to allow even more control than is currently available. For example, depending on the selected grid resolution, one can locally increase or decrease the field strength and hence set the heating rate and maximum temperature that the target experiences. This enables, for example, a fast adaption to new mold geometries and locally tuned part properties.

At least one of the electrodes/capacitor plates is therefore split into a collection of elements or segments (e.g., a grid of such elements/segments), which may be moved parallel to the z axis, which is taken to lie along the direction from the electrode/capacitor plate towards the molding cavity, but which are, in some embodiments, at all times still electrically connected to a main body of the electrode (be it the active or passive side, in some embodiments, the passive), which is then further connected to a radiation generator or ground potential (in some embodiments, ground potential as this allows for a simpler construction). The distance between the electrode elements/segments and the molding cavity, and hence between the opposing electrodes/capacitor plates, influences the local field strength in the gap between the two electrodes/capacitor plates, and hence within the molding cavity. This distance may be set by any form of actuator and the distance control can take place on the individual segment level. It is, in some embodiments, possible to keep all elements always in electrical contact and to not have the segment control system interfere with the electromagnetic fusion process.

For example, a set of runs was performed using an aluminum breadboard that holds an array of screws. The screws were manually set to different heights. For fusion of particles of expended thermoplastic polyurethane (eTPU), clear differences in the heating rate and maximum temperature were achieved for the different electrode configurations. The properties of the manufactured parts also changed locally and accordingly.

In summary, by using the disclosed apparatus, improved prototype/part quality may be achieved, and it is highly suitable for product testing and/or prototyping. Quicker process development for new products can thus result and lower cost tooling is available. Varying the distance of the segments to the molding cavity, and with that the distance between the two electrodes/capacitor plates, during the fusion process can also allow for new methods of process optimization and thus product optimization.

Further details, options and embodiments of such an apparatus as well as some of the related technical advantages are discussed in the following.

As already mentioned, the segments may be electrically connected to an electrically conductive electrode main body. The electrode main body can in particular be on ground potential.

Particularly, the capacitor plate that is connected to the radiation source (e.g., a generator for RF radiation) may be a first capacitor plate on one side of the molding cavity, and the capacitor plate that comprises the several segments that have an adaptable distance to the molding cavity may be a second capacitor plate on an opposite side of the molding cavity.

For example, as mentioned in the beginning, an "active" capacitor plate connected to the radiation source and a "passive" capacitor plate containing the adjustable segments may be arranged on opposing sides of the molding cavity and enclose the molding cavity in between them, and by adjusting the distance of the segments to the molding cavity effectively the distance between the two capacitor plates is also locally changed. In the molding cavity, this leads to a change in the field strength distribution of the electromagnetic field flooding the molding cavity, and hence at the particle surfaces that are being welded under the influence of the electromagnetic field.

The distance of the segments to the molding cavity may be individually adjusted by mechanical and/or electrical actuator means.

The segments can in particular be arranged in a two-dimensional grid, in particular in a rectangular grid.

The grid density (i.e., the number of adjustable segments per unit area) can also vary locally. For example, corresponding to the toe region and/or heel region of a shoe sole that is to be manufactured, segments may be arranged with an increased density compared to other parts of the sole, to allow for an even higher degree of control of the welding process in these regions.

Alternatively, or in addition, to changing the density of the arrangement of the segments, also their radiation-emitting surface area may be locally changed. For example, screws or pins with different head sizes may be used (typically: smaller head sizes in regions with a higher density of segments).

As just mentioned, the segments may be provided as screws or pins adjustably connected to the electrode main body. The screws can for example be metal screws that are screwed into the electrode main body, and the electrode main body can also be made from metal or comprise metal, for example aluminum.

A cover sheet, or cover layer, of electrically non-conductive material can further be arranged on the electrode main body and comprise openings in which the screws or pins are arranged.

Such a cover sheet may be used to increase the stability of the arrangement of the segments itself, e.g. by providing lateral stabilization to the segments, particularly when they are moved out a long distance from the electrode main body (e.g., if the screws are screwed out from the base plate almost to their full length). But it can also serve to provide a stable platform on which further parts of the molding tool that lie between the electrode/capacitor plate and the molding cavity may rest. Without this sheet or layer the adjustable position of the segments would lead to a varying support surface for the adjacent components of the molding tool, which not only necessitates a more complicated construction but can also be detrimental to the stability of the tool.

Such a cover sheet may be made from or comprise an electrically insulating cover. In some embodiments, the cover sheet is made from or comprises at least one of the following materials: polytetrafluoroethylene (PTFE), polyethylene (PE), especially ultra-high molecular weight polyethylene (UHMWPE), polyether ketone (PEEK), a thermoplast, a duroplast, polyethylene terephthalate (PET), polyoxymethylene (POM), polystyrene (PS), an insulating mineral material.

One option is that each of the adjustable segments may be set to one of at least the following four positions: removed or electrically disconnected, a low position, a medium position, a high position.

The adjustable segments can, for example, be electrically disconnected by tuning of a resonant circuit as disclosed herein with regard to the other aspects of the invention, and/or by simple switch-type elements.

Rather than being adjustable to predetermined positions, some or all of the segments can also be adjusted continuously in their positions (i.e. at any position between a lowermost and an uppermost position).

Having a finite set of predetermined position can facilitate the operation of the apparatus, while have the possibility of a continuous adaption of the segment position (in the z direction, i.e. towards and away from the molding cavity) increases the amount of influence and control that may be exerted on the electromagnetic field strength distribution.

It may be possible that the position of the segments may be adjusted while the molding cavity is irradiated or flooded with electromagnetic radiation. Again, it is pointed out that by their "position", the position in z direction, or height, of the segments is referred to. In other words, changing the position of the segments changes their distance to the molding cavity.

As already discussed and explained above, adjusting the position of at least one of the segments, i.e., their distance from the molding cavity and thus generally also from the opposing electrode/capacitor plate, influences the field strength distribution of the radiated electromagnetic field within the molding cavity.

Additionally, the shape of the capacitor plate that is connected to the radiation source can also at least partially be adapted to the geometry of the part that is to be manufactured (i.e. the shoe sole or part of a shoe sole like a midsole or part thereof).

A fifth aspect of the present invention that goes hand in hand with the fourth aspect and that may also make use of, or rely on, any of the options, embodiments and examples disclosed in the context of the first, second and/or third aspect of the present invention, is a method for the manufacture of a shoe sole or part of a shoe sole from foam particles.

In an embodiment, the method comprises: a.) loading the particles into a molding cavity of a molding tool which is formed from at least two molding halves which define the molding cavity, wherein at least two capacitor plates are arranged adjacent to the molding cavity, wherein at least one of the capacitor plates is connected to a radiation source, and wherein at least one of the capacitor plates comprises several segments that have an adaptable distance to the molding cavity; b.) irradiating the molding cavity with electromagnetic radiation emitted by the capacitor plates; and c.) locally adjusting a field strength distribution of the irradiating electromagnetic field within the molding cavity by modifying the adaptable distance of the segments to the molding cavity.

The modifying can occur before and/or during irradiation of the molding cavity with the electromagnetic radiation.

The foam particles are, in some embodiments, made of, or comprise, expanded thermoplastic materials, especially thermoplastic polyurethane (TPU), polylactate (PLA), polyamide (PA), polyether block amide (PEBA), polyethylene terephthalate (PET), polybutylene terephthalate (PBT), or thermoplastic polyester ether elastomer (TPEE). The foam particles may also be a bead containing multiple polymer types in one foam particle or the foam particles may be a mixture of different particles of different foam polymers or combinations thereof. In some embodiments, the foam particles consist of 90% by weight of one or a mixture of these materials. These foam particles are particles that comprise a so-called bead foam, also known in the art as a pellet/particle foam. Often the foams derived from the use of connected foam particles are given the designation "e" to denote the bead form of the polymer foam component, for example, eTPU.

It is mentioned that such foam particles are also referred to in the art as particles of expanded material, an expanded material being a material that has already been foamed (compared to an expandable material, which may be foamed but has not yet been foamed). In other words, the particles have a core of foamed material already before being inserted into the mold.

Examples of how the invention may be implemented are explained in more detail below using the attached drawings. In addition, explicit reference is made to the published documents DE102016100690A1, DE102016123214A1, and DE102019127680, as well as to the published applications DE102015202013A1 and DE102016223980A1 owned by the applicant of the present application, in which apparatuses and methods are described in detail, which are further developed and improved by the aspects of the invention.

DETAILED DESCRIPTION

A possible design of an apparatus 1 for the production of a particle foam part, in particular a shoe sole or a midsole or a part of a shoe sole/midsole, is shown in FIG. 1. The apparatus 1 comprises a material container 2, a molding tool 3 and a line 4 leading from the material container 2 to the molding tool 3.

The material container 2 is used to hold loose foam particles. The material container 2 has a base 5, and it is connected in the base 5 to a compressed air source 7 via a compressed air line 6. The compressed air line 6 is connected to several nozzles (not shown) arranged in the base 5, so that several air streams (=fluidizing air) may be introduced into the material container 2, which swirl the foam particles contained therein around and thus separate them.

In the area of the base 5 of the material container 2 an opening is formed to which the conveying line 4 is connected. The opening may be closed by means of a slide valve (not shown).

Adjacent to the material container 5 there is a propelling nozzle 8 in the conveying line 4, which is connected to the compressed air source 7 via a further compressed air line 9. Compressed air supplied to this propelling nozzle 8 serves as transportation air, as it enters the conveyor line 4 through the propelling nozzle 8 and flows in the direction of the molding tool 3. This creates a negative pressure at the propelling nozzle 8 on the side facing the material container 2, which sucks foam particles out of the material container 2.

The conveying line 4 leads to a filling injector 10, which is coupled to the molding tool 3. The filling injector 10 is connected to the compressed air source 7 via a further compressed air line 11. The compressed air supplied to the filling injector 10 is used on the one hand to fill the molding tool 3 by applying the compressed air to the flow of foam particles in the direction of the molding tool 3. On the other hand, the compressed air supplied to the filling injector 10 can also be used to blow back the foam particles from the conveying line 4 into the material container 2 when the filling process at the molding tool 3 is completed.

Molding tool 3 is formed from two molding halves 12, 13. Between the two molding halves 12, 13 at least one molding cavity 14 is defined, into which the filling injector 10 opens for introducing the foam particles. The volume of the molding cavity 14 may be reduced by bringing the two molding halves 12, 13 together. When the molding halves 12, 13 are moved apart, a gap is formed between the molding halves 12, 13, which is known as the crack gap. For this reason, such a molding tool 3 is also referred to as a crack gap mold.

A respective capacitor plate 15, 16 is arranged on each of the molding halves 12, 13. These capacitor plates 15, 16 each consist of a material with good electrical conductivity, such as copper or aluminum. The filling injector 10 is located on the molding half 13. The filling injector 10 extends through a recess in the capacitor plate 16, which is mounted on the molding half 13.

The two capacitor plates 15, 16 are each formed from several segments 85, 86, which are arranged adjacent to each other and are electrically and mechanically connected to each other. The segments 85, 86 are detachable from each other.

By adding or removing individual segments 85, 86, the size of the first capacitor plate 15 formed from the segments 85 and the size of the second capacitor plate 16 formed from the segments 86 may be adapted to the size of the molding tool 3. In this way, different sized molding tools 3 may be arranged between the capacitor plates 15, 16. This makes it possible to generate electromagnetic radiation between the capacitor plates 15, 16 specifically only in the area of molding cavity 14. In areas where no electromagnetic radiation is required for welding foam particles, it is possible to avoid generating electromagnetic radiation by removing individual segments 85, 86.

The segments 85, 86 are each attached to an insulator 80, 81 and form two opposing segment arrangements. The insulators 80, 81 are used to hold the segments 85, 86 in place on two opposite sides of the molding tool 3.

The insulators 80, 81 with the segments 85 and 86 attached to them are mounted so that they can move relative to each other. This means that the molding halves 12, 13 of molding tool 3 together with the segmented capacitor plates 15, 16 which rest against the sides of the molding tool 3 may be moved towards and away from each other. Furthermore, it is possible to exchange the molding tool 3 when the segment arrangements 85, 86 are moved apart.

As an option, segments 85, 86 can also be attached to molding tool 3 in such a way that they may be detached from molding tool 3 and from each other. In this case both insulators 80, 81, or at least one of them, may be omitted.

One of the segments 85 is connected via an electrical line 17 to a generator 18 for the transmission of high-frequency voltages, which forms an AC voltage source. The electrical connection of the segments 85 to each other causes high-frequency voltages to be applied to them, thus forming the capacitor plate 15.

The segments 86 on the opposite side of the molding half 13, which form the capacitor plate 16, are electrically connected to ground 30, as is the generator 18. As the segments 86 are also electrically connected to each other, only one of the segments is connected to ground 30.

Generator 18 is a source of electromagnetic radiation. The generator is, in some embodiments, designed to generate RF radiation. The generator can also be designed to generate microwave radiation. In the case of larger molding cavities 14, RF radiation may be used to heat the molding tool 3 much more evenly than microwave radiation. In addition, most plastic materials can absorb RF radiation much better than microwave radiation. Therefore the use of RF radiation is used in some embodiments.

The molding halves 12, 13 each have a base body, which may be formed from an electrically non-conductive and, in particular, for electromagnetic RF radiation essentially transparent material, such as polytetrafluoroethylene (PTFE), polyethylene (PE), in particular ultra-high molecular weight polyethylene (UHMWPE), polyether ketone (PEEK). In some embodiments, only the capacitor plates 15, 16 are electrically conductive. The "essentially transparent material" is a material that may be penetrated by electromagnetic radiation, especially RF radiation. However, this material may be specifically designed with a certain absorption coefficient for electromagnetic RF radiation in order to convert part of the electrical RF radiation into heat and to heat the molding halves 12, 13. This is explained in more detail below.

The molding tool 3 can optionally be connected to a vacuum pump so that a vacuum may be applied to molding cavity 14. This vacuum causes the moisture contained in molding cavity 14 to be extracted.

The capacitor plates 15, 16 may be equipped with a cooling device. In the present example, the cooling device is provided by fans 20, which direct cooling air to the side of the capacitor plates 15, 16 facing away from the molding cavity 14. Cooling fins may be provided to increase the cooling effect.

Alternatively or additionally, cooling lines can also be arranged on the capacitor plates 15, 16, through which a cooling medium is passed. The cooling medium, in some embodiments, is a liquid, such as water or oil.

The apparatus 1 can also be designed with a steam generator and a steam supply to the molding cavity 14 and/or to the conveying line 4 to supply saturated dry steam to the molding cavity 14 for heating the foam particles and/or to wet foam particles during their transportation from the material container 2 to the molding cavity 14. It is also possible to wet the foam particles, which are located in the material container 2, with water in liquid form. For this purpose, corresponding nozzles may arranged in the material container 2, which vaporize the water.

Figure 2:
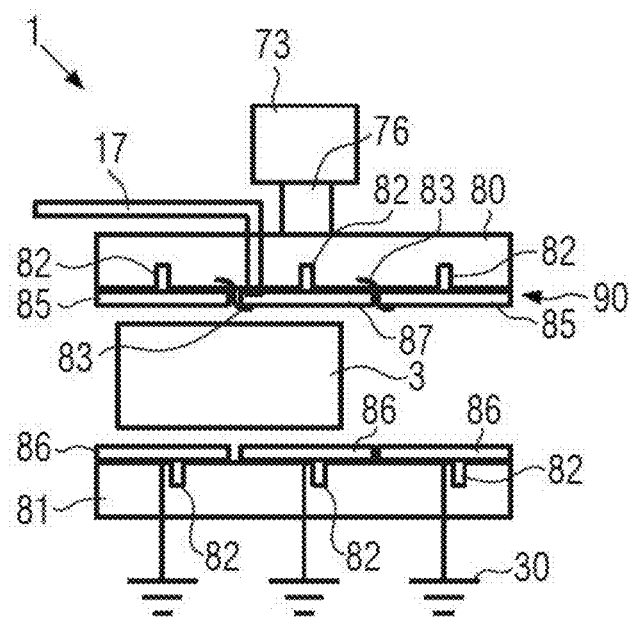
FIG. 2 is a schematic representation of a segmental arrangement forming two opposing capacitor plates for the production of a particle foam part.

To illustrate further details of the apparatus 1, FIG. 2 schematically shows an enlarged partial view of the apparatus 1 as a sectional view, but in this example, unlike the example shown in FIG. 1, each of the segments 86 of the second capacitor plate is connected to ground 30, as a further option. In all other respects, the explanations given in FIG. 1 also apply to FIG. 2 and vice versa, with similar elements in the figures having the same reference numerals.

Fasteners 82, which are, in some embodiments, designed as screws, are used for detachable fastening of segments 85, 86 to the respective insulator 80 or 81.

Electrically conductive connecting elements 83, which are designed as electrically conductive, flexible metal elements in the form of foils, for example copper or brass foils, serve to electrically connect the segments 85 to each other, which are arranged next to each other and form the first capacitor plate 15.

The connecting elements 83 electrically connect two or more adjacent segments 85 at their edges. When fastening the segments 85 to the insulator 80, the electrically conductive connecting elements 83 are pressed against the edges of the segments 85. This creates an electrical connection between its segments 85 for the capacitor plate 15.

In the example shown here, on the second capacitor plate 16 the connecting elements 83 are not absolutely necessary due to the grounding of the individual segments 86 on the plate 16, but they can optionally be provided and arranged here in the same way as for the first capacitor plate 15.

By contrast, in the example shown in FIG. 1, they are provided on both capacitor plates 15, 16, since only one of the segments 86 of capacitor plate 16 is connected to ground 30.

The electrical line 17, designed as a high frequency line, connects one of the segments 85 with the generator 18 (see FIG. 1). The segment electrically connected to the generator 18 is designed as high frequency connection segment or generator connection segment 87. Due to the electrical connection between the adjacent segments 85, the entire segment arrangement 85 is electrically connected to the generator 18 and forms the first capacitor plate 15.

In this way, the segments 85 form a capacitor plate set 90, which combined make it possible to form the first capacitor plate 15, which may be connected to an RF radiation source and whose size may be adapted to the size of the molding tool 3. The capacitor plate 15 can also be adapted to the dimensions of mold cavity 14 within mold 3.

Segment 87, which is designed as an RF connection segment and includes a connection area for line 17 for connection to generator 18, forms a first capacitor plate segment of capacitor plate set 90.

The other segments 85 form second capacitor plate segments for forming the capacitor plate 15, i.e. the first capacitor plate segment 87 and at least one of the second capacitor plate segments 85 are designed to together form the capacitor plate 15 and form the capacitor plate set 90. The area of the capacitor plate 15 that may be produced by the capacitor plate set 90 may be adapted to the size of the molding tool 3 for the production of a particle foam part, e.g. a shoe sole or midsole or part thereof.

The first capacitor plate segment 87 and the second capacitor plate segments 85 are designed to be fastened to the insulator 80 using fasteners 82.

The segments 86 of the second capacitor plate 16 arranged opposite the first capacitor plate 15 form further capacitor plate segments of the capacitor plate set 90. The further capacitor plate segments 86 complement the capacitor plate set 90 by enabling the production of a second capacitor plate 16 and thus allow the formation of a complete capacitor (from the first and second capacitor plates 15, 16). They are designed for mounting on the insulator 81.

Both insulators 80, 81 may be components of the capacitor plate set 90.

In the example shown here, a press 73 is also shown, which is connected via a cylinder-piston unit 76 to the insulator 80, which is located on one side of the molding tool 3. The insulator 81, which is located on the opposite side of the molding tool 3, is stationary, so that the molding tool 3 may be pressed together between the two capacitor plates 15, 16, which are attached to the insulators 80, 81 on the side facing the molding tool 3.

As a result, the foam particles located in molding cavity 14 of molding tool 3, which is designed as a crack gap mold, may be compressed during their exposure to the electromagnetic radiation. In this way, the foam particles are not only pressed together due to their thermal expansion as a result of the electromagnetic heating, but also by mechanically pressing together the two molding halves 12, 13 of the molding tool 3.

Figure 3:
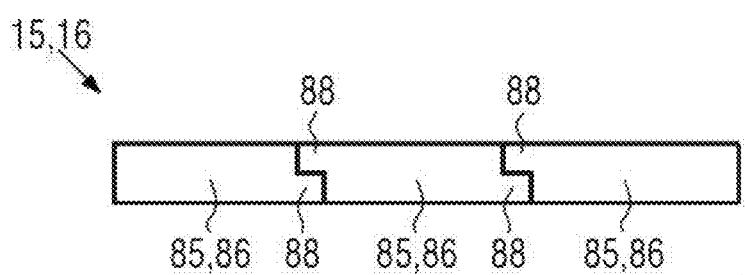
FIG. 3 shows an arrangement of interconnected segments schematically as a sectional view.

FIG. 3 shows another possible way of connecting adjacent segments 85 and 86 of the capacitor plates 15 and 16, as they are shown in FIGS. 1 and 2 and also in further embodiments that will follow. The segments 85, 86 each have edge areas 88 protruding from the segment body at their edges, which are designed in such a way that they interlock when the segments 85, 86 are joined together. The edge areas 88 form a stepped seam at the joints of the segments 85, 86. In this way, a particularly reliable electrical and mechanical connection between the segments 85, 86 is created, which can also be achieved very cost-effectively.

Figure 4:
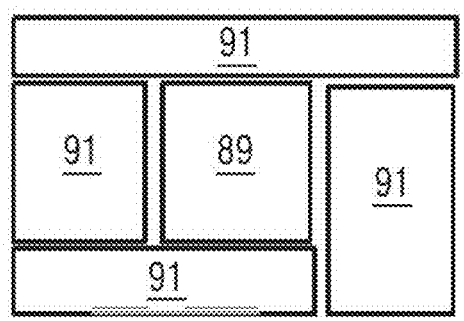
FIG. 4 shows an arrangement of segments, which together form a capacitor plate, as a schematic view of the surface of the capacitor plate.

FIG. 4 shows an example of an arrangement of the segments 85, 86, which form the capacitor plate 15 and the capacitor plate 16, respectively, and may be produced by the capacitor plate set 90. The figure shows a view of the surface of the capacitor plate.

In this arrangement, a central segment 89 is arranged centrally and surrounded by additional segments 91. The central segment 89 has a square shape. The additional segments 91 each extend along one side of the central segment to 89 and along one side of another additional segment.

In the example shown here, a first additional segment 91 is provided in addition to the central segment 89, which extends along one of the sides of the square. A second additional segment 91 is provided which extends along another side of the square and along one side of the first additional segment 91, a third additional segment 91 is provided which extends along another side of the square and along the second additional segment 91, and a fourth additional segment 91 is provided which extends along the remaining side of the square and along two sides of the additional segments 91.

In this way, different rectangles may be formed by combining several segments 85, 86 as capacitor plate surfaces. In addition, further additional segments may be provided to complete the arrangement or to surround it in the manner of a further ring of segments. The central segment 89 can also be formed as a rectangle.

In addition to rectangles and squares, other different dimensions, shapes and geometries of the segments 85, 86 are also possible and capacitor plates can thus be obtained in a wide variety of shapes.

In the following, further embodiments of the invention are explained on the basis of FIGS. 5 to 9, wherein identical, similar or functionally equivalent elements are again marked with the same reference signs as in the preceding figures, and have already been explained above.

Figure 5:
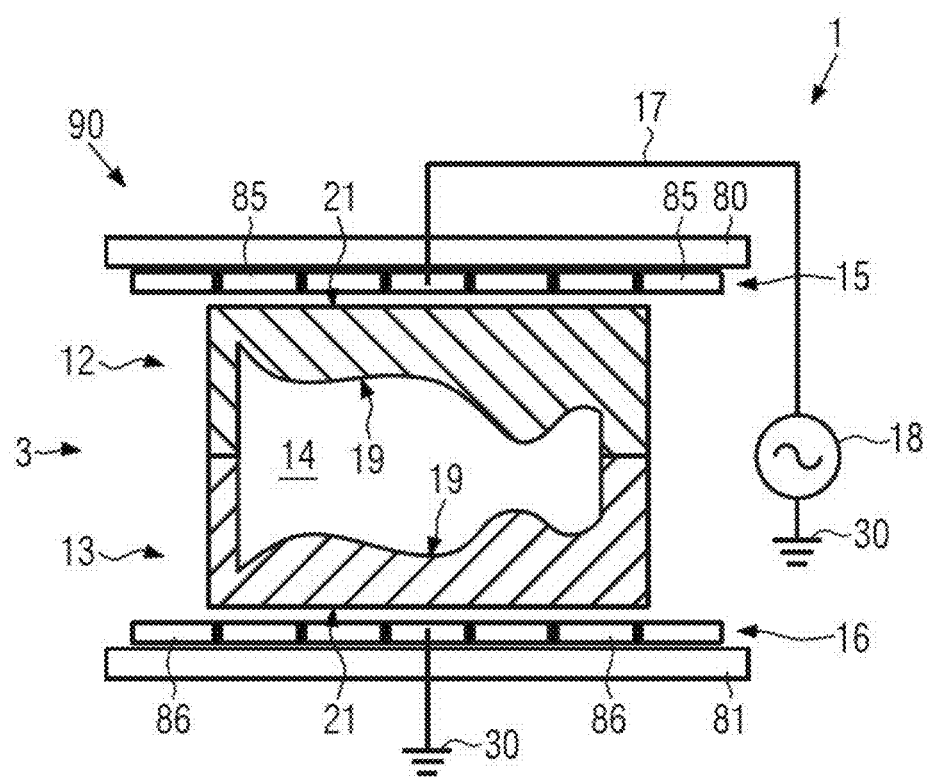
FIGS. 5-8 show different apparatuses for producing a particle foam part according to different embodiments of the invention.

The molding tool 3 of the apparatus 1 according to FIG. 5 is formed by two molding halves 12, 13, each of which has a base body made of an electrically non-conductive material that is transparent, especially to electromagnetic RF radiation. This material is PTFE, PE, PEEK or another material transparent to RF radiation. The molding halves 12, 13 define a molding cavity 14. In the present design example, molding cavity 14 has inner boundary surfaces 19, which have a contoured shape deviating from a flat surface.

The molding halves 12, 13 each have a flat outer surface 21, on which a capacitor plate 15, 16 is arranged. The space between the contoured boundary surfaces 19 and the outer surfaces 20 is filled with material that is transparent to electromagnetic radiation.

With this molding tool 3, three-dimensionally contoured particle foam parts may be produced, whereby the shape of the particle foam part is defined by the inner boundary surfaces 19 of the molding halves 12, 13. Such a molding tool 3 is suitable, e.g., for producing small particle foam parts with a substantially uniform density. It can also be used for the production of a shoe sole or midsole or part thereof.

The capacitor plates 15, 16 are flat and are designed as described above with reference to FIGS. 1 to 4. The first capacitor plate 15 is formed by adjacent segments 85. The second capacitor plate 16 is also made up of adjacent segments 86.

Each of the collection of segments 85 and 86 is attached to an insulator 80 and 81, respectively, with fasteners 82, whereby the segments 85 of the first capacitor plate 15 are mechanically and electrically conductive, detachably connected to each other as explained above with reference to FIGS. 2 and 3. Likewise, the segments 86 of the second capacitor plate 16 are mechanically and electrically conductive and detachably connected to each other.

The segments 85, 86 and optionally also the insulators 80, 81 are components of a capacitor plate set 90 as described above.

The problem with large or thicker particle foam parts is that they heat up more in the middle than at the edges, which can destroy the particle structure. To avoid an uneven heating of the central area and the edge area of a particle foam part, the molding tool 3 may be tempered and/or additional heat may be added to the foam particles within molding cavity 14, e.g. at the edge area, as described in DE102016100690A1.

By a modification of the depicted apparatus 1 which will be explained in more detail below, it is possible to switch off individual segments 85, 86 even before the end of the welding process, to prevent overheating of the foam particles located between the respective segments.

The embodiments discussed above each have flat capacitor plates 15, 16. In another embodiment, the molding tools 3 may be designed in such a way that the capacitor plates 15, 16 are adapted to the shape of the particle foam part to be produced or the molding cavity 14. This may be beneficial, for example, for the production of shoe soles or midsole or parts therefore with a complex three-dimensional geometry, to promote an even welding of the foam particles throughout the component.

Figure 6:
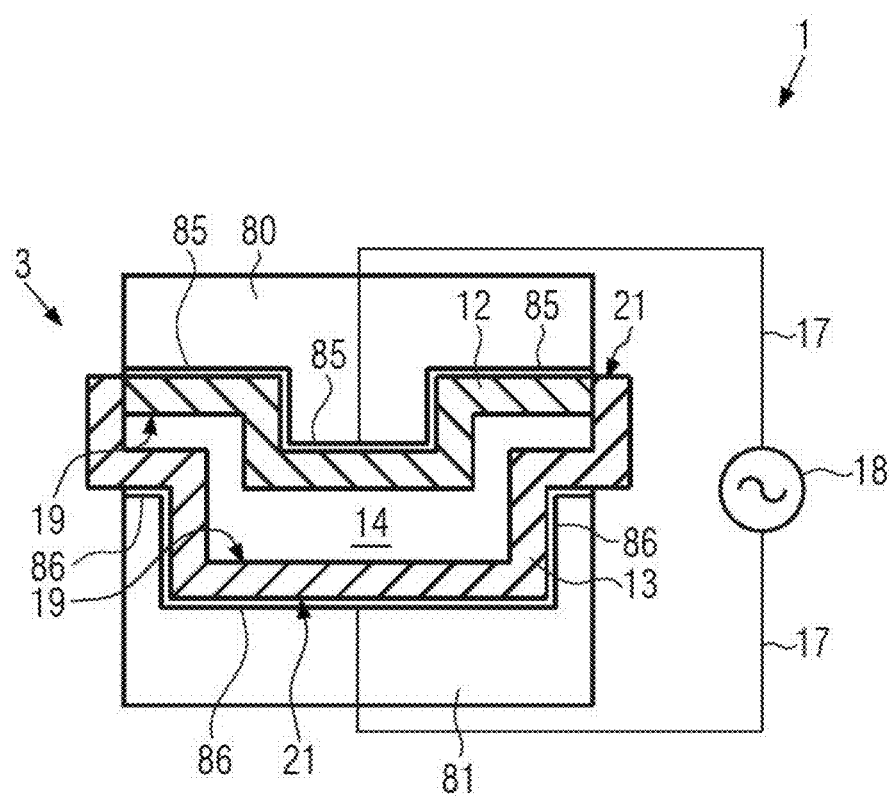

The embodiments of the apparatus 1 shown in FIG. 6 has two molding halves 12, 13, which by their inner boundary surfaces 19 define a step-shaped molding cavity 14. The outer surfaces 21 of the molding halves 12, 13 are adapted to the contour of the corresponding inner boundary surfaces 19 of the respective molding half 12, 13. In other words, the inner boundary surfaces 19 are mapped to the respective outer surfaces 21 of the mold halves 12, 13, and the molding tool 3 can hence be formed with a uniform thickness from the outer surface 21 to the inner boundary surface 19. On the outer surface 21, small structures of the inner boundary surface 19 are smoothed out in some embodiments.

Molding tool 3 thus has two contoured molding halves 12, 13, and against their outer surfaces 21 a correspondingly contoured, respective segmented capacitor plate 15, 16 rests, which is formed from several segments 85 or 86 and is otherwise designed as described above with reference to FIGS. 1 to 5.

Such an adaptation of the shape of the capacitor plates with segments 85, 86 to the shape of the particle foam parts to be produced is particularly useful for shell-shaped particle foam parts (e.g., boxes or bowls with spherically shaped segments), or, as already mentioned above, for shoe soles or midsoles or parts therefore.

Also in the example shown here, insulators 80, 81 are used to hold the segments 85, 86 in place. The sides of the insulators facing the molding halves are adapted to the shape of the outer surfaces 20 of the molding halves 12, 13.

Figure 7:
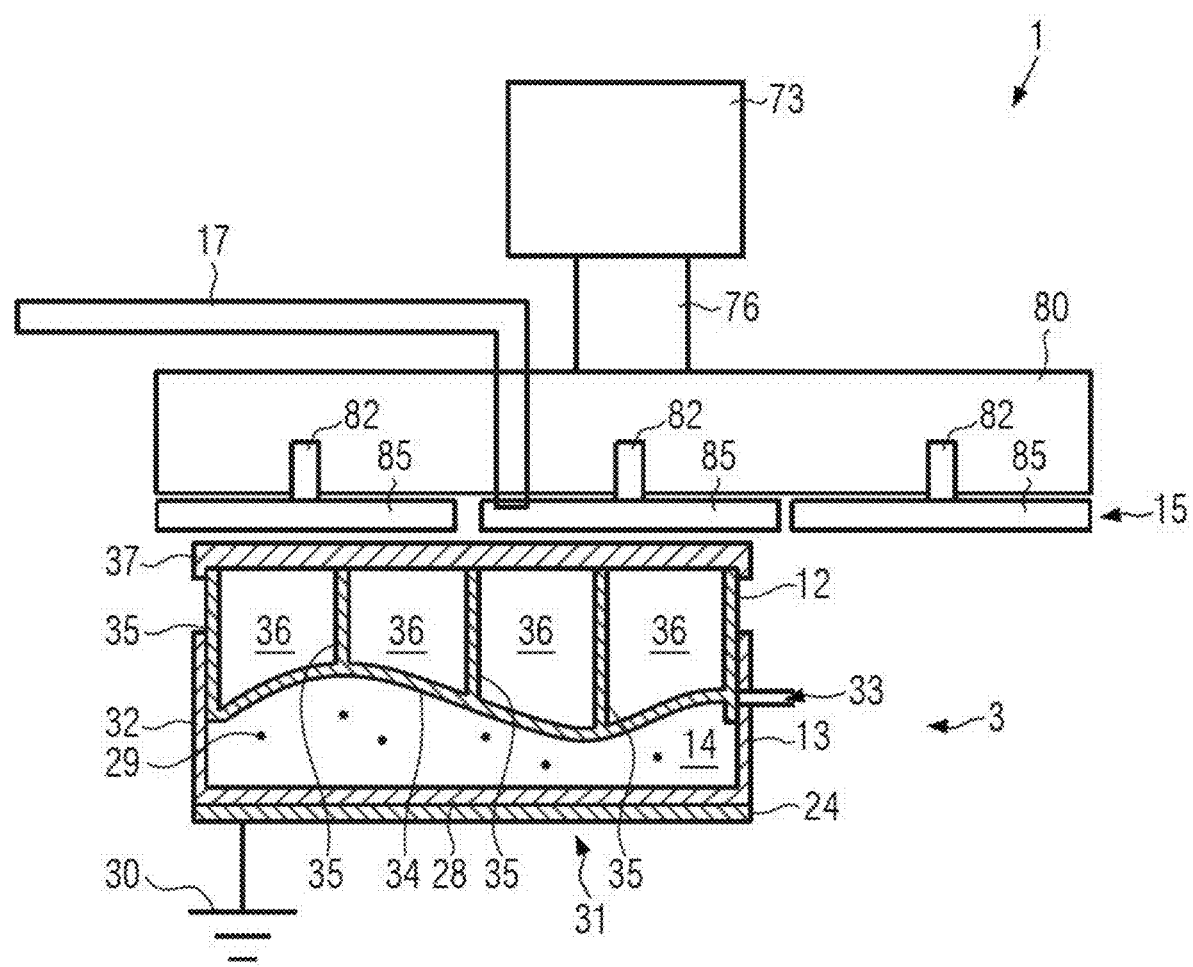

FIG. 7 shows another embodiment, in which the first capacitor plate 15 formed from segments 85 together with the insulator 80 and the pressing tool formed by the press 73 and the cylinder-piston unit 76 is generally provided as described above with reference to FIGS. 1 to 4. Reference is made in particular to FIG. 2 and the related description.

In this embodiment, molding tool 3 has a first molding half 12 and a second molding half 13, which form a molding cavity 14 between them, in which foam particles 29 to be welded are located. In addition to the description of molding tool 3 that now follows, reference is also made to the German patent application No. 10 2019 127 680.2, in which further details of molding tool 3 are explained.

The second molding half 13 or at least a part of it is electrically conductive or made of electrically conductive material. The molding tool 3 may be used as part of the apparatus 1, wherein the second molding half 13 serves as a second capacitor plate and is electrically connected to ground 30 for this purpose.

The second molding half 13 has a base body 24 made of an electrically conductive material. This base body 24 consists of aluminum, copper or an alloy with good electrical conductivity, for example. It is optionally provided with an electrically insulating coating 28 and forms a bottom wall 31. The electrically conductive base body 24 has an electrical connection to be connected to the generator 18 or to ground 30.

The generator 18 (see FIGS. 1, 5 and 6), which is electrically connected to the segmented capacitor plate 15 by the high-frequency line 17, generates electromagnetic waves or an electrical alternating voltage with respect to ground potential 30, which is applied to the base body 24 of the second molding half 13. This creates an electromagnetic alternating field, especially RF radiation, in the molding cavity 14 between the segmented capacitor plate 15 and the base body 24.

A circumferential side wall 32 of the second molding half 13 is formed from an electrically non-conductive material, in particular from a plastic material, and extends from the bottom wall 31 and starting on the sides of the molding half 13 in the direction of the first molding half 12, such that the molding cavity 14 is laterally limited.

However, it is also possible that both the bottom wall 31 and the side wall 32 are formed by the electrically conductive base body 24. However, it is important that there is no electrically conductive connection between the two molding halves 12, 13.

The first molding half 12, which is located on the side of molding tool 3 facing the segmented capacitor plate 15, is made of an electrically non-insulating material as described above.

The first molding half 12 forms a plunger which can enter the cavity formed by the second molding half 13, thus sealing the molding cavity 14. The tight seal between the two molding halves 12, 13 is at least tight enough to prevent foam particles 29 from escaping. Molding cavity 14 is not necessarily sealed gas-tight, however.

The first molding half 12 has an inner boundary wall 34, which is contoured and defines molding cavity 14. Starting from the boundary wall 34, several partitions 35 extend in the direction of the first capacitor plate 15 towards an optional cover element 37. The partitions 35 serve to support the boundary wall 34. Cavities 36 are formed between the partitions 35 in the first half of the mold 12, which considerably reduce its mass.

This leads to a beneficial reduction of the influence on the electromagnetic field strength in molding cavity 14, which considerably improves the flexibility in the use and shaping of the molding cavity 14 as well as the plunger molding half 12.

Furthermore, the cavities 36 may be used to trim the plunger mold half 12 to influence the electromagnetic field in the mold cavity 14, in addition to the flexibility achieved by changing or adjusting the surface of the capacitor plate 15 by different combinations of segments 85. Trimming can also be used to achieve a particularly uniform or even distribution of the field strength in the molding cavity 14.

Trim bodies made of a dielectric material (not shown in the figure) can also be inserted into the cavities 36. Due to the polarizing properties of a dielectric, the electromagnetic alternating field is concentrated by the dielectric lying in the path of the field lines in the adjacent region of the molding cavity 14. In regions along the path of the same field line which are kept vacant by the dielectric, the field is not concentrated in the adjacent region of the molding cavity 14, such that the field is weaker in this region of the molding cavity 14 than in a region of the molding cavity 14 that is adjacent to a dielectric. By using trimming bodies of different size, shape and permittivity, the electric field can thus be additionally influenced in different ways. The permittivity of a dielectric is greater than that of vacuum or air.

All these measures additionally contribute to the fact that the electromagnetic field is especially targeted, which results in an even further increased effectiveness of the disclosed apparatus and promotes an even welding of the particles throughout the component, also for complex geometries as encountered with, e.g., shoe soles or midsoles or parts thereof.

The two molding halves 12, 13 may be moved relative to each other by means of a press 73, and a predetermined force may be applied to them. For this purpose, the press 73 is connected via a cylinder-piston unit 76 to the insulator 80, to which the first capacitor plate 15 formed by the segments 85 is attached, as described above with reference to FIG. 2. To press the two molding halves 12, 13 together, the first molding half 12 is moved by the movable segmented capacitor plate 15 in the direction of the second molding half 13 by means of the press 73.

On the second molding half 13 there is a through-hole for feeding the foam particles 29, which is referred to as the filling opening 33. A filling injector 10 (see FIG. 1) is connected to the filling opening 33. The filling injector 10 differs from conventional filling injectors in that it does not have a closing mechanism for closing the filling opening 33, as explained in more detail below.

The first molding half 12 has at least one through-holes (not shown in the figure) to allow air to escape.

The filling opening 33 and the venting openings are arranged on a section or area, in particular an edge area, of the second molding half 13, which is covered by the first molding half 12 when the molding tool 3 is closed. As a result, the filling opening 33 and the venting opening are automatically closed when the molding tool 3 is closed by inserting the first molding half 12 into the cavity formed by the second molding half 13. This means that it is not necessary for the filling injector 10 to have a closing mechanism with which the filling opening 33 is closed.

Because the molding halves 12, 13 both delimit the molding cavity 14 and at the same time form one of the capacitor plates, the distance between the "capacitor plates" and the molding cavity 14 is very small. As a result, the losses of electromagnetic radiation are very low, which means that the proportion of power that is introduced as heat into the foam particles 29 to be welded is very high. Such a tool thus permits very efficient welding of the foam particles 29 to form a particle foam part.

Figure 8:
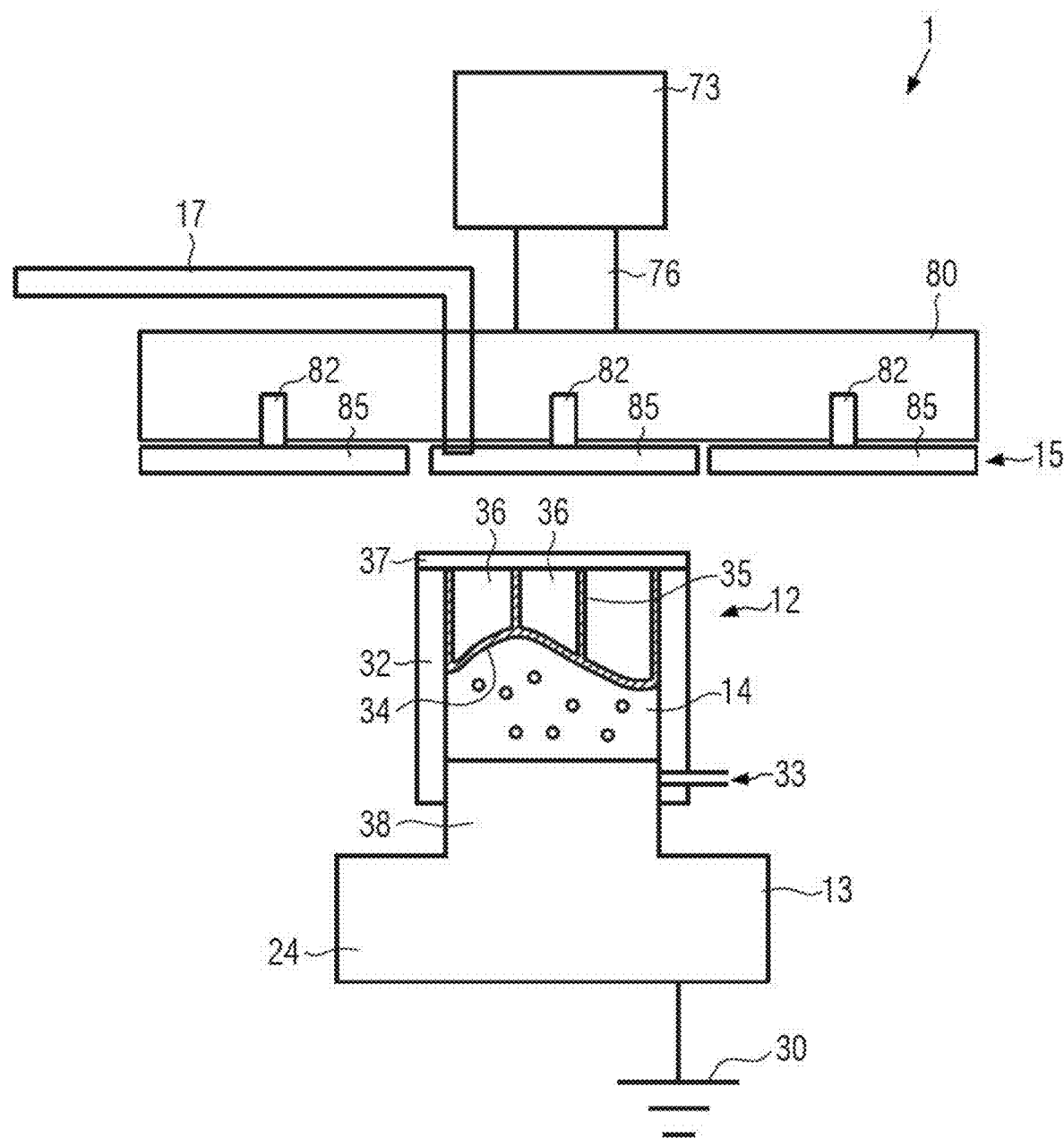

FIG. 8 shows an apparatus 1 for producing a particle foam part according to another embodiment, in which, similar to FIG. 7, the second molding half 13 is formed from electrically conductive material and is connected to ground potential 30, thereby serving as a second capacitor plate.

The first molding half 12 is electrically non-conductive and, as in the version shown in FIG. 7, comprises a boundary wall 34, which is contoured and is firmly connected to a cover element 37 by partitions 35. Here, too, cavities 36 are formed between the partitions 35 to influence the electromagnetic field in the molding cavity 14 between the two molding halves 12, 13, as explained in detail above.

In contrast to the embodiments shown in FIG. 7, the circumferential side wall 32, which closes off the molding cavity 14 at the sides, is formed on the first molding half 12. Within the side wall 32, a part 38 of the electrically conductive second mold half 13 protrudes into in the molding cavity 14 formed by the circumferential side wall and closes the mold cavity 14 on this side, while it is closed on the opposite side by the boundary wall 34 of the first mold half 12.

The foam particles 29, which are located in molding cavity 14, are compressed by the protruding part 38 when the two molding halves 12, 13 are pressed together by the segmented capacitor plate 15 being pressed towards the first molding half 12 by means of the press 73.

A filling opening 33 for filling the foam particles 29, which leads into the molding cavity 14, is opened by moving the two molding halves 12, 13 apart and closed by moving the two molding halves 12, 13 towards each other, as described above including with further details with reference to FIG. 7.

Figure 9:
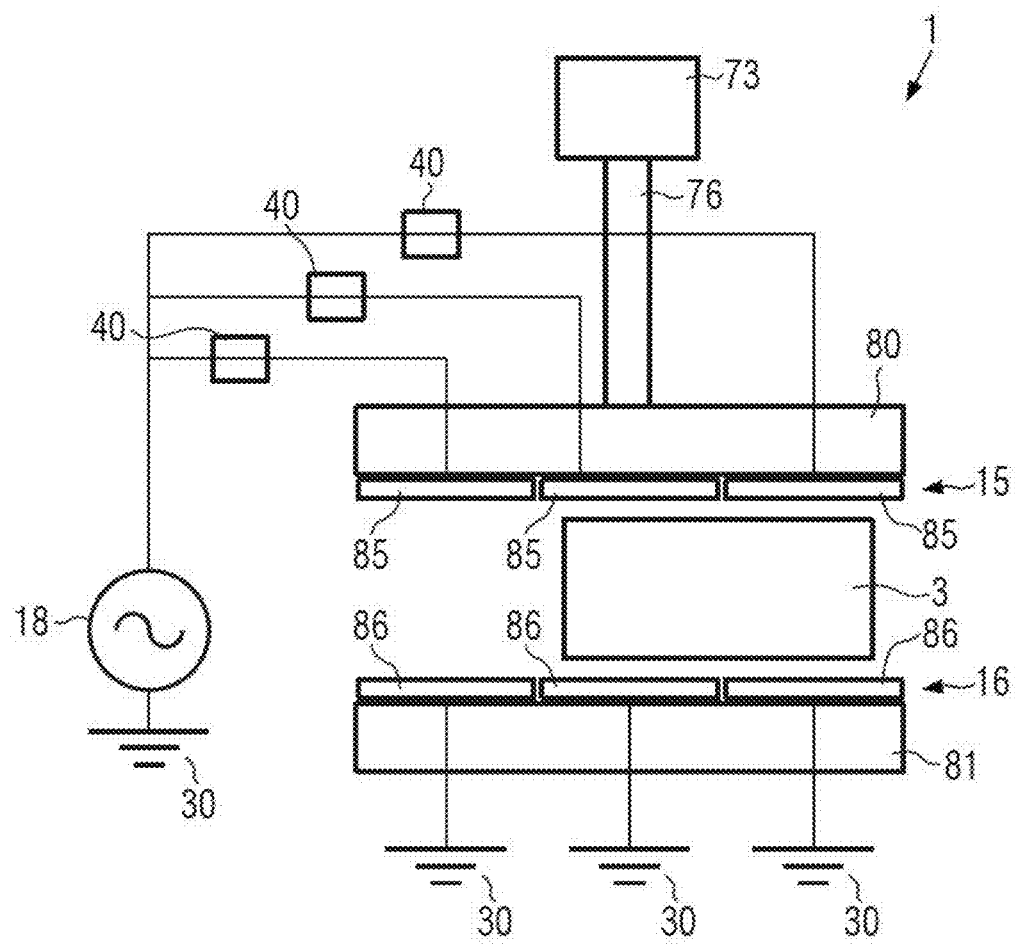
FIG. 9 shows an arrangement for exposing a molding tool to electromagnetic radiation according to further embodiments of the invention in schematic form.

FIG. 9 shows other embodiments of the invention in which the segments of the capacitor plates are electrically insulated from each other.

In the apparatus 1 shown here, the segments 85 of the first capacitor plate 15 formed by them are permanently attached to the insulator 80, electrically insulated from each other, with each segment being separately connected to the generator 18 via a tunable resonant circuit 40. The generator 18 is connected to ground potential 30.

The segments 86, which form the second capacitor plate 16, are electrically connected to ground 30, as is the generator 18. The segments 86 are permanently attached to the insulator 81. If, as in the case shown here, all segments 86 are connected to ground, it is not absolutely necessary to arrange the segments 86 electrically isolated from each other. It is also possible to make the second capacitor plate 16 continuous or not segmented or divided into segments and to connect it electrically to ground 30.

In case the segments 86 of the second capacitor plate 16 are electrically isolated from each other, the generator 18 may be connected to each of the segments 86 instead of to ground 30, in which case the segments 86 are not connected to ground 30.

As described above with reference to FIG. 2, the isolator 80 is mechanically connected to a press tool, which is formed by a press 73 and a cylinder-piston unit 76. This allows the insulator 80 with the segments 85 of the first capacitor plate 15 attached to it to be pushed towards the second capacitor plate 16, which is located opposite, so that a pressing force is exerted from both sides on the molding tool 3, which is located between the two capacitor plates 15 and 16 for welding foam particles arranged therein.

The insulators 80, 81 and the segments 85, 86, as well as the tunable resonant circuits 40 form a capacitor plate set 90. The segments 85, 86 are designed as capacitor plate segments and may be designed as in the above described versions and embodiments. They can also have a geometry and form a two-dimensional arrangement as described above.

Molding tool 3 may be designed as in one of the above described versions and embodiments. Small modifications may be necessary to arrange the capacitor plates 15, 16 according to FIG. 9.

Figure 10:
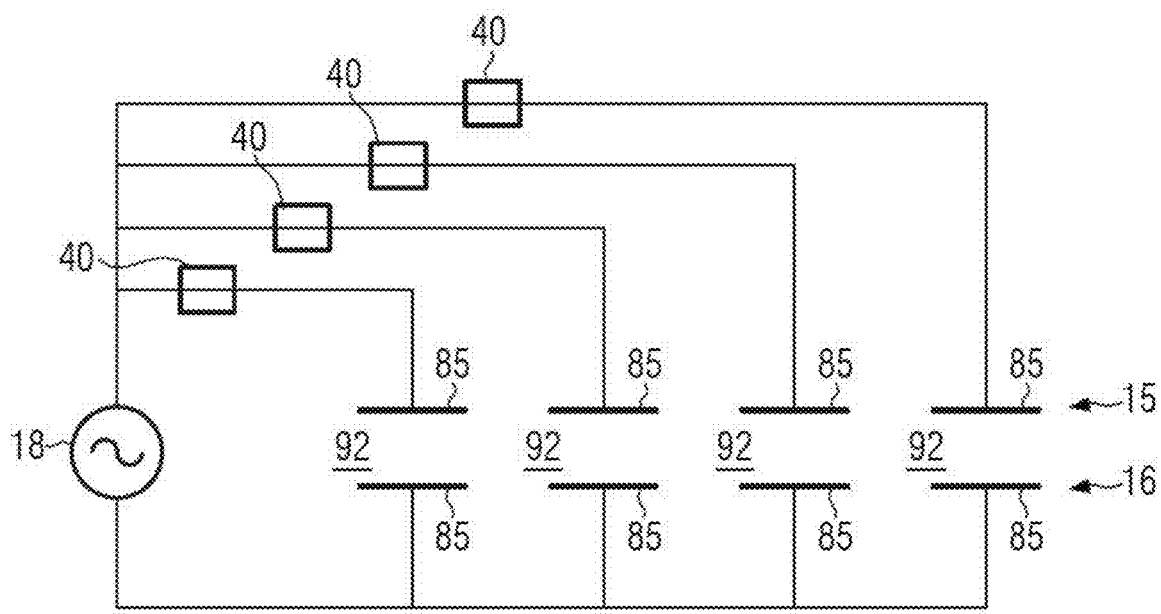
FIG. 10 schematically shows an equivalent circuit diagram for an arrangement of segments, each of which is separately connected to a radiation source for generating electromagnetic radiation.
Figure 11:
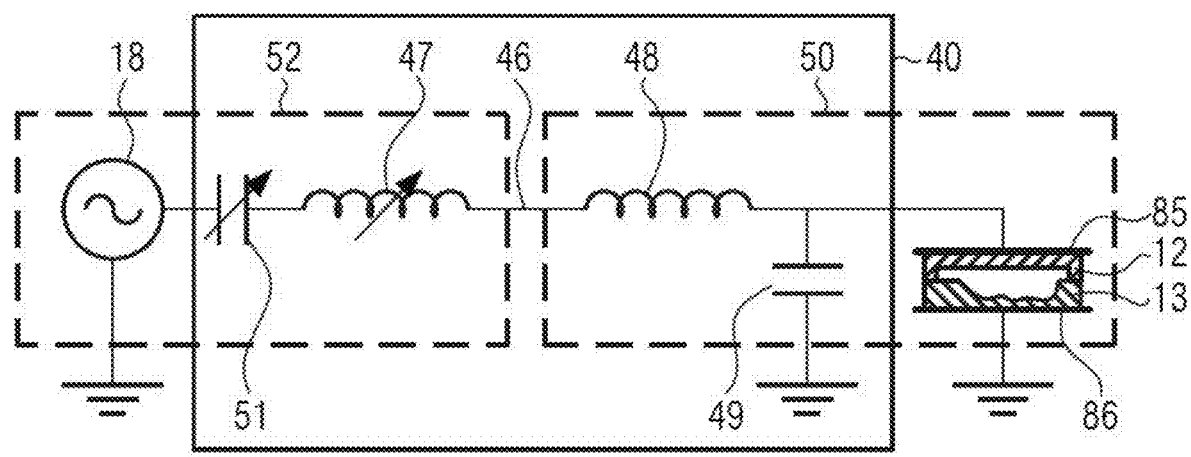
FIG. 11 shows a switching device for connecting or disconnecting a capacitor plate segment to or from the capacitor plate to emit electromagnetic radiation.

FIGS. 10 and 11 are used below to explain the operation of the device shown in FIG. 9. FIG. 10 schematically shows a simplified equivalent circuit diagram of the device according to FIG. 9.

FIG. 11 shows a single device for controlling the electrical power supplied to segment pairs 85, 86 in a schematic simplified circuit diagram. In particular, FIG. 11 shows schematically in an electrical circuit diagram the generator 18 and the partial capacitor formed by the segments 85, 86, which encloses the molding halves 12, 13, and a connection line (hollow waveguide or coaxial line) 46 suitable for transmitting the electromagnetic waves, with which the electromagnetic waves are transmitted from the generator 18 to the molding partial capacitor 85, 86. The hollow waveguide forming the connection line 46 is, in some embodiments, designed as a coaxial air line with an electrically conductive inner tube and an electrically conductive outer tube. The coaxial air line is dimensioned so that high voltage signals may be reliably transmitted. The characteristic impedance, in some embodiments, is set to about 50Ω.

In this connection line 46 a generator-sided inductance 47 and a tool-sided inductance 48 are symbolically indicated. These inductances are caused by the line itself, whereby the length of the respective line sections determine the value of the respective inductance. A tool-sided capacitor 49 is connected in parallel with the respective tool sub-capacitor 85, 86. This capacitor 49 represents the electrical capacitance between the capacitor segment 85 and the housing 35 of the molding tool 3. The tool capacitor 85, 86, the capacitor 49 and the tool-sided inductor 48 form a tool resonant circuit 50.

A generator-sided capacitor 51 is connected in series with generator 18 and the generator-sided inductance. The generator-sided capacitor 51 and the generator-sided inductance 47 form a generator resonant circuit 52. At least the generator-sided capacitor 51 or the generator-sided inductance 47 is provided variably, for example by using a capacitor with capacitor plates that may be spaced apart or by providing connection line sections of different lengths. It is also possible that both the generator-sided capacitor 51 and the generator-sided inductance 47 are variable. The generator-sided capacitor 51 may be equipped with a servomotor, which, when actuated, changes the distance between the two capacitor plates, for example by moving one of the two capacitor plates in a straight line, such that both capacitor plates are always parallel to each other, or by swiveling one of the two capacitor plates.

By changing the capacity of the capacitor 51 or the inductance 47, the resonance frequency of the generator resonant circuit 52 may be changed or tuned. If the resonant frequencies of the generator resonant circuit and the tool resonant circuit match, the maximum electrical power is transmitted from the generator 18 to the tool resonant circuit 50 and thus to the tool sub-capacitor (or partial capacitor) 85, 86. By changing the resonant frequency of the generator resonant circuit 52, the transmission of the electrical power may be controlled in a targeted manner, wherein the more the resonant frequencies of the two resonant circuits 50, 52 differ, the lower the transmitted power. The tuning of the generator resonant circuit 52 can thus be used to specifically adjust the electrical power introduced into the molding cavity 14.

In the present embodiment, the resonant frequency of the generator resonant circuit 52 is changed. It is equally possible to change the resonant frequency of the tool resonant circuit 50. This has the same effect with regard to the transmission of the electrical power. However, it is more difficult to provide a variable capacitor or a variable inductance on the tool side than on the generator side.

The segments 85, 86 thus each form a tool capacitor or tool sub-capacitor or tool partial capacitor, which is separately connected to the generator 18 via its own tunable resonant circuit 40. The resonant circuit 40 thus comprises the tool resonant circuit 50 as well as the generator resonant circuit 52. By tuning the two resonant circuits 50, 52, the tool capacitors 85, 86 may be separated from the generator 18 individually or in groups by changing the resonant frequency, so that no power or hardly any power is transmitted to them. In this way, they may be switched on or off from the radiation-emitting arrangement of capacitor plate segments 85, 86, by changing the resonant frequency of one (or both) of the two resonant circuits 50, 52.

The resonant circuit 40 thus forms a switching device 41 for connecting or disconnecting a capacitor plate segment 85 to or from the capacitor plate 15, or capacitor plate segment 86 to or from the capacitor plate 16, respectively. The segments 85, 86 may be connected or disconnected individually or in groups as partial capacitors to form the capacitor 15, 16.

This means that the electromagnetic radiation source 18 is part of a generator resonant circuit 52, while any connection lines for guiding the electromagnetic waves together with a respective pair of segments 85, 86 that form a partial capacitor form a tool resonant circuit 50. By changing an inductance or a capacitance, the tool resonant circuit 50 may be tuned in its resonant frequency and forms a tunable resonant circuit.

In other words, the regulating or control device for controlling the tunable resonant circuit may be designed in such a way that the power supply from the generator resonant circuit to the tool resonant circuit is switched on or off or interrupted by its tuning, wherein (at least) one of the two resonant circuits is provided as a tunable resonant circuit. In this way, the segment(s) in question is added to or removed from the capacitor plate that is formed from several such segments and which applies electromagnetic radiation to the molding tool during the welding process.

By controlling the energy supply on the individual lines, it is possible to set and control which segments 85 of capacitor plate 15 (and/or segments of 86 of the capacitor plate 16) are operated and which are not. By switching individual segments on and off by means of resonant circuit tuning, the size of the capacitor plates 15, 16 may be adapted to the size of the molding tool 3 with regard to its radiation-emitting surface. This means that it is not necessary to mechanically remove or attach individual segments 85, 86 depending on the molding tool 3 in order to adapt the surface of the capacitor plates 15, 16. It is also not necessary to mechanically interrupt or mechanically switch the connection lines 46 between the generator 18 and the individual segments 85, 86.

For further details we refer to the already mentioned publication DE102016123214A1, which describes the circuit for tuning in more detail.

Figure 12:
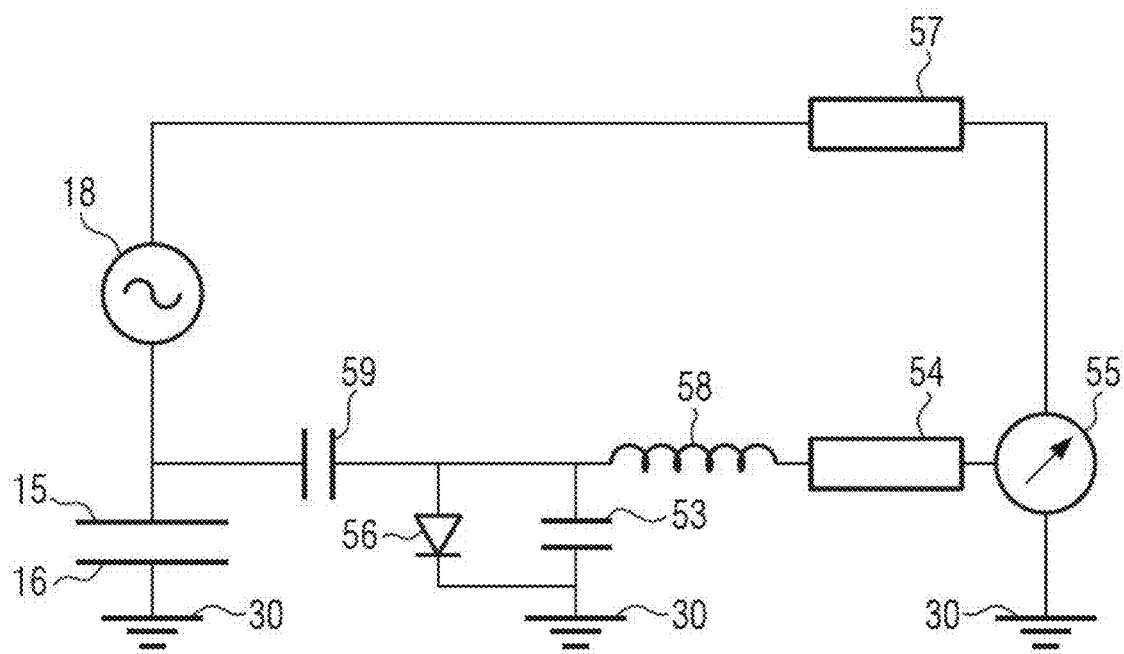
FIG. 12 shows a control device for controlling the power supply in a circuit diagram.

FIG. 12 shows a device for controlling the electrical power supplied to the tool capacitor 15, 16 in a schematically simplified circuit diagram. The generator 18 is connected to the tool capacitor 15, 16. A measuring capacitor 53 is connected in parallel to the tool capacitor 15, 16. Its electrical capacitance is a fraction of the electrical capacitance of the tool capacitor 15, 16. The measuring capacitor 53 is connected via a coaxial line 54 to a voltage measuring device (voltmeter) 55. In some embodiments, a diode 56 is connected in parallel with the measuring capacitor 53. The coaxial line 54 is connected in series with an inductor 58, which is used to filter high-frequency signals.

The measuring unit consisting of the measuring capacitor 53 and the diode 56 is separated from the tool capacitor 15, 16 by an isolating capacitor 59. The isolating capacitor has a high dielectric strength. The capacitance of the isolating capacitor 59 is smaller than the capacitance of the measuring capacitor 53, which means that a higher voltage drop occurs across the isolating capacitor 59 than across the measuring capacitor 53. The ratio of the capacitance of the isolating capacitor 59 to the capacitance of the measuring capacitor 53 is, in some embodiments, 1:100 or 1:1.000 or 1:10.000. As a result, the voltage applied to tool capacitor 15, 16 is reduced in the measuring unit 53, 56 in such a way that it lies within a measuring range of the voltage measuring device 55 and may be reliably detected by the latter.

With this circuit, a voltage drop occurs at measuring capacitor 53 which corresponds to the voltage applied to tool capacitor 15, 16 and is reduced according to the ratio of the capacitance of measuring capacitor 53 to the capacitance of isolating capacitor 59. By providing diode 56, only the oscillation halves of a certain polarity are generated. The diode 56 thus forms a rectifier of the voltage occurring at measuring capacitor 53. This measuring voltage is measured with the voltage measuring device 55 and converted into a measuring signal. The measuring signal is forwarded to a control device 57 which automatically controls the generator 18 to deliver a predetermined electrical power, in order to generate a specific voltage on the tool capacitor or a specific measuring voltage on the measuring capacitor, which is a fraction of the voltage on the tool capacitor.

The device shown in FIG. 11 may be further provided in such a manner that for several or all pairs of segments 85, 86 a device for controlling the electrical power supplied to the capacitor formed by the respective pair of segments 85, 86 is provided in accordance with FIG. 12. This allows the power of each respective pair of segments 85, 86 to be controlled individually and the effective size of the tool capacitor to be set without the need for any moving parts. No calibration of the resonant circuits (generator resonant circuit, tool resonant circuit) is necessary either, since the actual power or voltage supplied to the respective segment pair 85, 86 may be measured in a closed control loop and individually adjusted for the individual segment pair 85, 86.

An example of a process for manufacturing a particle foam part, like for example a shoe sole or a midsole or a part thereof, is described below with reference to the embodiments of FIG. 1. Foam particles are filled into a molding cavity 14 of a molding tool 3. Adjacent to the mold cavity 14, two capacitor plates 15, 16 are arranged, which are electrically connected to a radiation source 18 for electromagnetic radiation and generate electromagnetic radiation.

Capacitor plates 15, 16 or at least one of them is formed by several segments 85, 86. The area of the capacitor plate 15, 16 is adapted to the size of the molding tool 3 by combining a suitable number of radiation generating segments 85 and/or 86.

The foam particles are welded together by the electromagnetic radiation between the capacitor plates 15, 16. The foam particles are heated in molding tool 3 by the electromagnetic radiation, i.e. heat is supplied to the foam particles by means of electromagnetic RF radiation. This welds them together to form a particle foam part.

Afterwards, the produced particle foam part is demolded and removed from the molding tool.

According to an example, the segments 85, 86 are detachably connected electrically and mechanically in order to combine them. In a modification as shown in FIG. 9, the segments 85, 86 are arranged electrically insulated from each other. By tuning an resonant circuit 40 connected to the respective segment, the segments 85, 86 are switched on or activated, or switched off or deactivated, in the capacitor plate 15, 16. In this way, they are combined with each other depending on the size and geometry of the molding tool 3.

This allows the surface of the capacitor plate 15, 16, which emits electromagnetic radiation, to be adapted to different molding tools 3. As a result, it is not necessary to mechanically remove or mechanically add segments 85, 86 when changing the molding tool 3. Mechanical separation or connection of segments to the radiation source 18 to adapt the surface of the capacitor plates to the molding tool 3 is not necessary. This means that different molding tools 3 (e.g., corresponding to different sole or midsole sizes, or to different sole or midsole constructions) may be electromagnetically irradiated one after the other in a very short period of time.

To carry out the procedure, for example, one of the apparatuses is used as shown in FIGS. 1 to 11 in different versions and embodiments or as discussed at other positions in this disclosure. Also, a capacitor plate set 90 as described above may be used to carry out the manufacturing process.

FIGS. 13a-f show (part of) an apparatus 1 with a capacitor plate 16 that comprises several segments 86 that have an adaptable distance d to the molding cavity 14, as well as corresponding measurement results obtained from a number of test runs on such an apparatus 1.

The general construction of the apparatus 1 may be of the same or similar design as any of the other apparatuses (in particular, embodiments of the apparatus 1) discussed herein so far. All of the options, embodiments, modifications and features already discussed can therefore also be used in, or combined with, that apparatus 1 that will now be described in relation to FIGS. 13A-F (as far as physically and technically possible, of course). This compatibility between the different disclosed aspects and embodiments is also borne out by the fact that the same reference signs as above will also be used for functionally identical or at least functionally similar or equivalent elements and components.

Figure 13A:
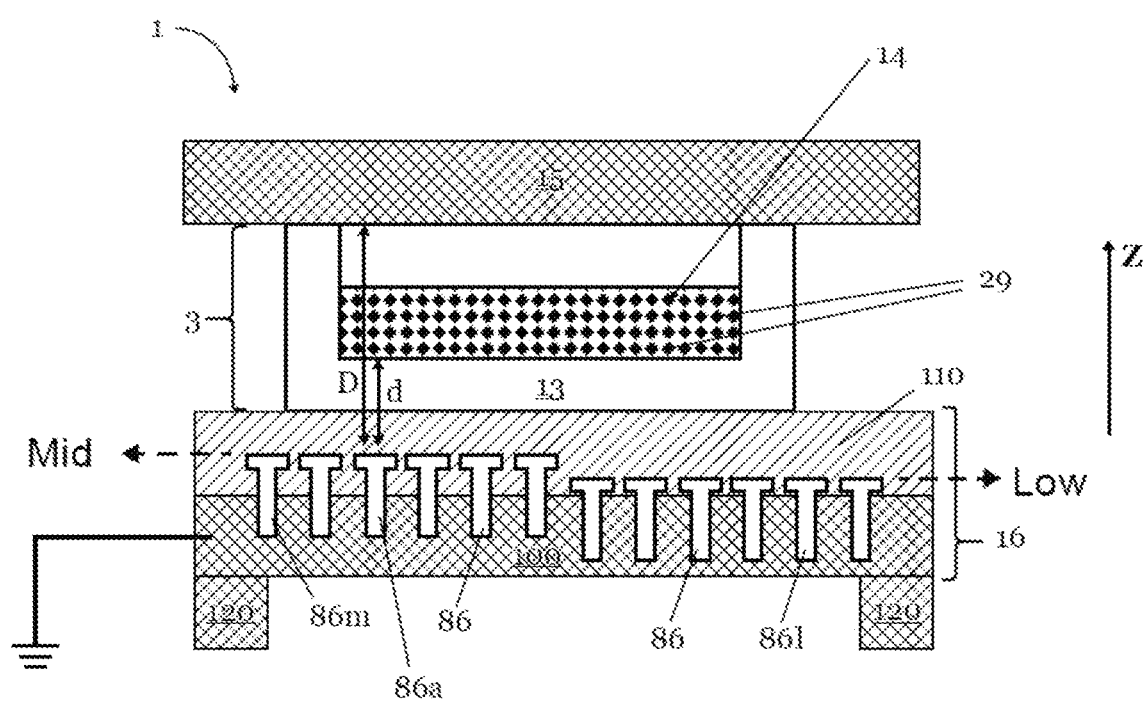
FIGS. 13A-13F show part of an apparatus with a capacitor plate that comprises several segments that have an adaptable distance to the molding cavity as well as corresponding measurement results obtained from a number of test runs on such an apparatus.
Figure 13B:
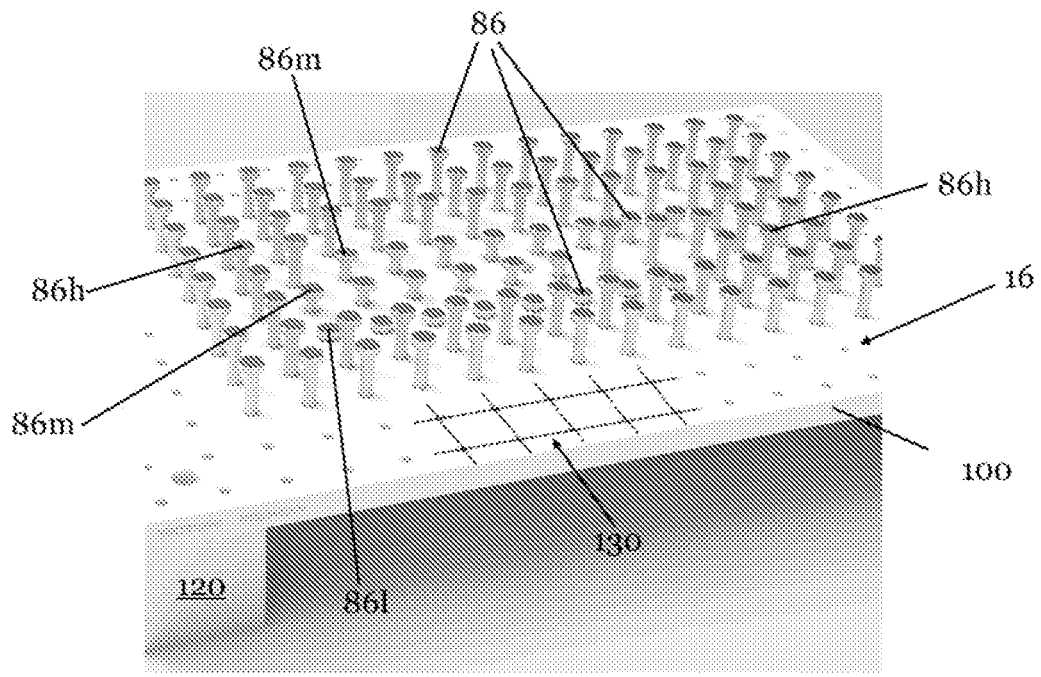
Figure 13C:
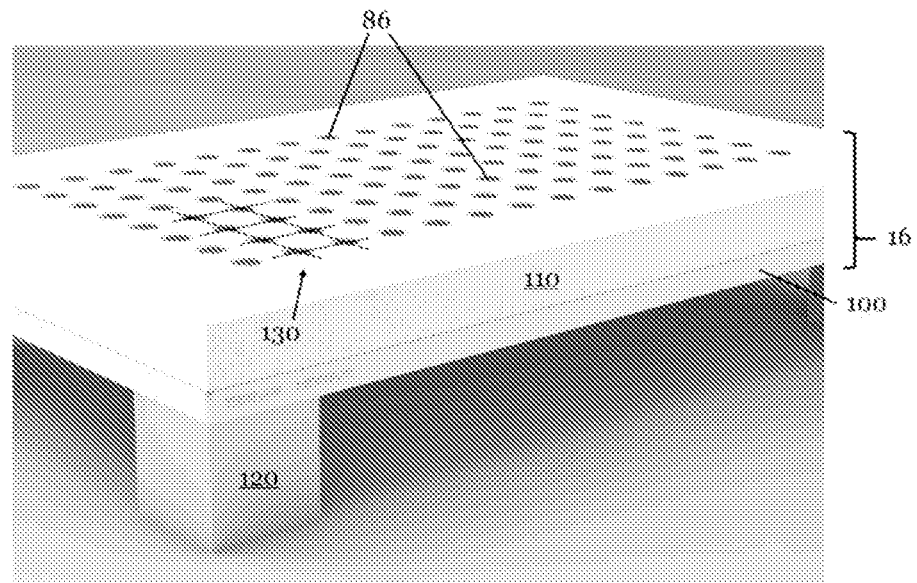
Figure 13D:
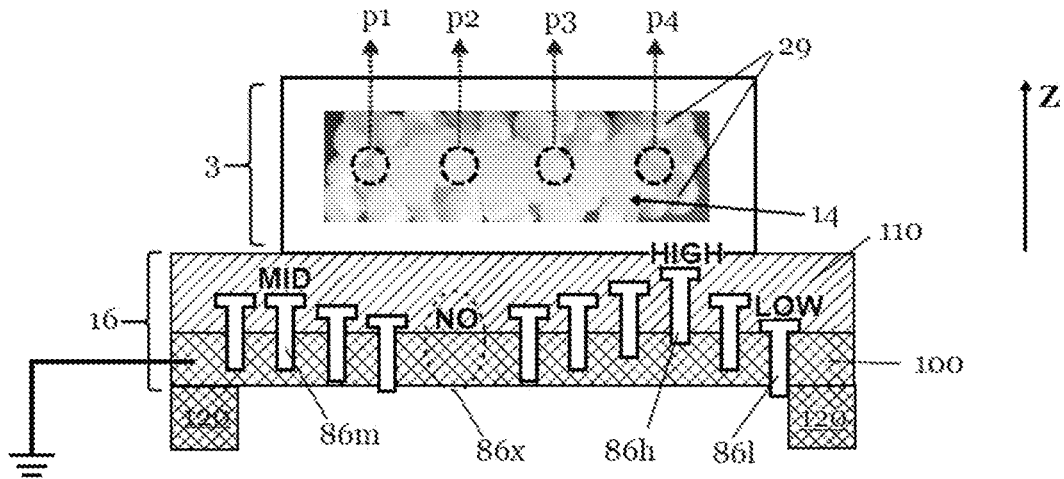

The disclosed apparatus 1 can, in particular, be used for the production of a particle foam part, particularly a shoe sole or part of a shoe sole (e.g., a midsole or part thereof). It comprises a molding tool 3 which is formed from (at least two) molding halves 12 and 13. The molding tool 3 defines a molding cavity 14, which is bounded by the two molding halves 12 and 13 (s., in particular, FIG. 13A). Into the molding cavity 14, particles 29 of foamed or expanded material are loaded (e.g., particles of eTPU, or one of the further materials mentioned in this regard herein) and then welded or fused together (predominately at their surfaces, so that the interior foam structure is maintained, s. FIG. 13D), to form the molded part.

The apparatus further comprises (at least two) capacitor plates 15 and 16 which are arranged adjacent to the molding cavity 14. "Adjacent" here means that the two capacitor plates 15 and 16 are arranged on two opposing sides of, and include the molding cavity 14 in between them, in such a manner that electromagnetic radiation emitted by the capacitor plates 15 and 16 floods the molding cavity 14 and leads to the desired welding of the foam particles 29.

One of the capacitor plates, here the first capacitor plate 15, is connected to a radiation source (not shown). The other capacitor plate, here the second capacitor plate 16, comprises several segments 86 that have an adaptable distance d to the molding cavity 14, i.e. their position along the z-direction (which is indicated in FIGS. 13A and 13D) may be changed, such that the distance d of the radiation-emitting surface of a respective segment 86 from the molding cavity (measured, e.g., with regard to a wall of the molding cavity 14 or a specific point of refence within the molding cavity 14) also changes. Consequently, the distance between the two capacitor plates 15 and 16 also changes locally by an adjustment of the position of a segment 86. The distance d of the segments 86 to the molding cavity 14 may be individually adjusted by mechanical and/or electrical actuator means (e.g., by hand, or by a wrench, or by an electrical motor or a linear actuator, or by a gear driven by a motor, etc., depending on the specific design of the segments 86).

For one of the segments, indicated as segment 86a in FIG. 13A, the distance to the molding cavity 14 is indicated as d, and the distance to the opposing capacitor plate 15 is indicated as D. Both these values change if the position of the segment 86a in the z-direction is changed.

The segments 86 are electrically connected to an electrically conductive electrode main body 100, which in the embodiments shown and discussed here is on ground potential and is provided as a metal block. However, in other cases it may be connected to the radiation generator instead, and the opposing capacitor plate may be grounded. Aluminum is one option, because it is of comparably low weight and may be easily processed.

In the case shown in FIGS. 13A-F, the segments 86 are provided as screws (e.g., pins are also possible, however) adjustably connected to the electrode main body 100. The screws 86 here are metal screws that are screwed into corresponding threads provided in the electrode main body 100.

While in FIGS. 13A-F all screws 86 are of the same type and size and have the same head size this is not the rule, and the type, length, thickness and head size of the screws 86 may also change across the electrode/capacitor plate 16. For example, smaller screws or screw heads may be used in regions where there are more screws per unit area, i.e., regions of the electrode/capacitor plate 16 where the density of segments 86 is higher (not shown in the figures; in FIGS. 13a-f the density of the segments/screws 86 is constant across the capacitor plate 16, apart maybe from the edges of the plate).

The segments/screws 86 are arranged in a two-dimensional grid, namely a quadratic grid in the embodiments of FIGS. 13A-F. This grid is indicated by dashed lines 130 in FIGS. 13B and 13C. Other kinds of grids are also possible, e.g., rectangular, triangular or hexagonal grids, or "mixed-type" grids comprising different geometrical shapes. The grid density (i.e., the number of adjustable segments/screws 86 per unit area) can also vary locally, as already explained above, even though this is not shown in FIG. 13A-F.

To allow the screws 86 to be fully screwed into the electrode main body 100 without hitting the floor (or a component of the apparatus 1) beneath, the capacitor plate 16 with its electrode main body 100 is mounted at its four corners on four aluminum blocks 120 that raise it a certain distance from the floor and make room for the screws 86 to protrude from the bottom side of the electrode main body 100 when fully screwed in, i.e., when adjusted to their lowermost position. The highest position achievable is when the screws 86 are almost completely screwed out of the electrode main body 100, but not quite. Generally, a little bit of play will be maintained to avoid unintended detachment of one of the screws 86 from the electrode main body 100 and/or a general loss of stability when coming close to the maximal height of the respective screw 86 above the electrode main body 100.

A cover sheet 110 of electrically non-conductive material is arranged on the electrode main body 100 (s. FIG. 13C; in FIG. 13B the cover sheet is removed to reveal the arrangement of the screws 86) and comprises openings in which the screws 86 are arranged. This not only helps to stabilize the screws 86 once they are in a medium or, in particular, a high position, i.e. screwed out to a large degree from the electrode main body 100. It also provides for a stable and even support surface for the adjacent components of the apparatus 1, in particular the molding tool 3, to rest on (s. FIGS. 13A, 13C, 13D, 13E and 13F).

Such a cover sheet 110 can generally be made from or comprise an electrically insulating cover. In some embodiments, the cover sheet 110 is made from or comprises at least one of the following materials: polytetrafluoroethylene (PTFE), polyethylene (PE), especially ultra-high molecular weight polyethylene (UHMWPE), polyether ketone (PEEK), a thermoplast, a duroplast, polyethylene terephthalate (PET), polyoxymethylene (POM), polystyrene (PS), an insulating mineral material. In the case shown in FIG. 13E, it is made from PTFE.

One option is that each of the adjustable segments/screws 86 may be set to one of at least the following four positions: removed (e.g., screwed out of the electrode main body 100) or electrically disconnected, a low position, a medium position, a high position. On the other hand, e.g., for adjustable segments that are provided as screws 86, it may also be possible to continuously vary their position in the z-direction, by turning or screwing them in or out to the desired degree (within the margins set by the lowermost and uppermost position, of course). Having a finite number of predetermined positions to which the segments/screws 86 are set can facilitate operation of the apparatus 1. In FIGS. 13A, 13B, 13D, 13E and 13F, exemplary screws being set to a low position, medium position and high position are indicated by reference numerals 86$l$ (for low), 86$m$ (for mid) and 86$h$ (for high), respectively. In FIG. 13D, as indicated by the dashed-line ellipse 86$x$, one of the screws has been removed completely (alternatively, it could be electrically isolated from the capacitor plate 16/ground potential).

It may be possible that the position of the segments/screws 86 may be adjusted while the molding cavity 14 is irradiated or flooded with electromagnetic radiation. Generally, however, for this to be possible an automated activation/adjustment mechanism will have to be employed (s. above), because during operation of the apparatus 1 a manual adjustment will generally not be allowed or possible, to avoid injuries.

As already discussed and explained above, adjusting the position of at least one of the segments/screws 86 influences the field strength distribution of the radiated electromagnetic field within the molding cavity 14. For example, in FIG. 13D four regions or positions p1, p2, p3 and p4 are schematically indicated within the molding cavity 14. These regions have screws 86 set to different positions/heights beneath them. For example, position p1 has screws set between the mid and low positions directly beneath it, position p2 has no screw at all beneath it (because the screw at position 86$x$ has been removed), position p3 has again screws set between the mid and low positions directly beneath it, and position p4 has screws set between the mid and high positions directly beneath it. In this manner the electric field strength distribution, and hence the temperature and welding conditions, may be adjusted and controlled at the different positions p1 to p4.

Figure 13E:
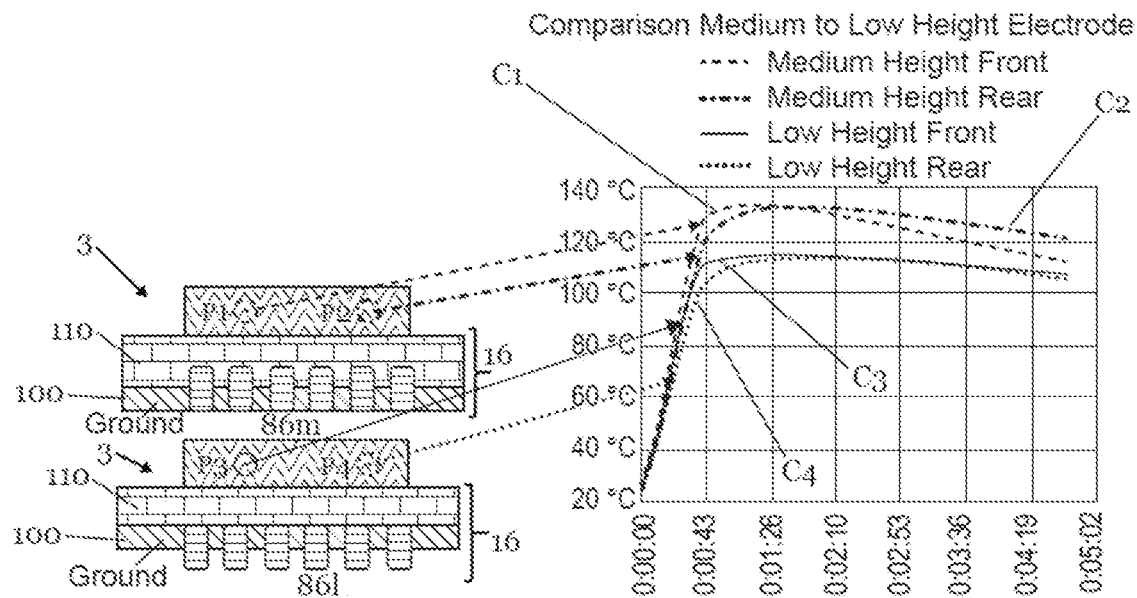
Figure 13F:
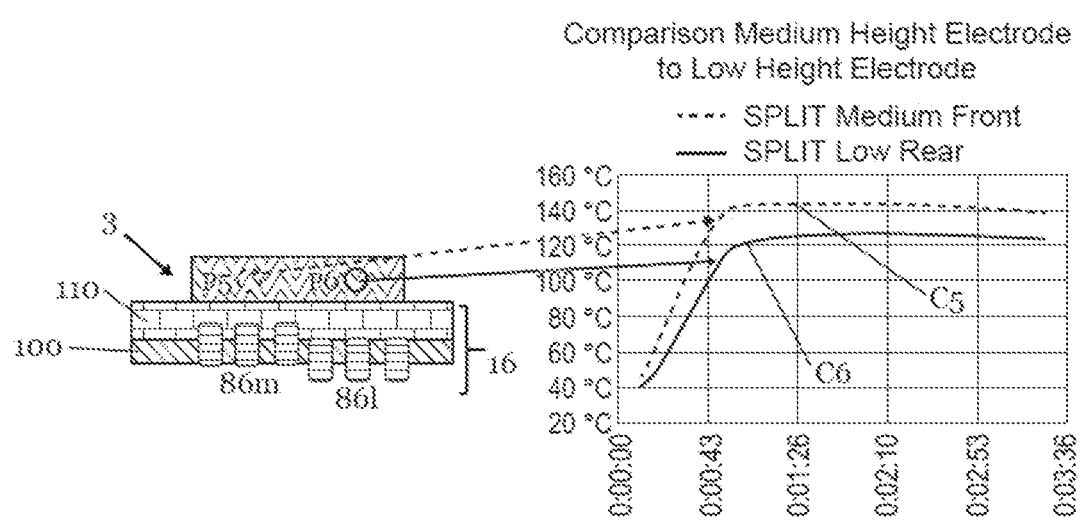

The experimental results shown in FIGS. 13E and 13F provide further insight into this aspect. On the left hand side of the two figures, different configurations of the apparatus 1 are schematically indicated that were used to investigate the heating rates and temperatures within a molding tool 3 under different positions of the screws 86 in the capacitor plate 16. In each of the three cases investigated, two reference positions were considered within the molding tool, designated as P1 and P2, P3 and P4 as well as P5 and P6 in FIGS. 13e-f, one in the front part of the tool (s. P1, P3 and P5, respectively), and one in the rear part of the tool (s. P2, P4 and P6, respectively). Using a constant setting of the radiation generator (not shown), and the different setting of the screws 86 as indicated in the left hand side of FIGS. 13e-f, the heating rates/temperatures at the positions P1-P6 were recorded over time, yielding the measurement curves C1-C6 shown on the right hand side of FIGS. 13E-F.

The x-axis in the measurement graphs on the right hand side of FIGS. 13E-F shows time (the distance between two adjacent ticks or grid-lines on the x-axis corresponds to approximately 43 seconds in FIGS. 13E and 13F), and the y-axis shows temperature (in the range form 20° C. to 140° C. in FIG. 13E and in the range form 20° C. to 160° C. in FIG. 13F).

In the upper case shown in FIG. 13E with all screws set to a medium/mid position 86$m$, the measurements at positions P1 and P2 yielded the measurement curves C1 and C2, respectively.

In the lower case shown in FIG. 13E with all screws set to a low position 86$l$, the measurements at positions P3 and P4 yielded the measurement curves C3 and C4, respectively.

In the case shown in FIG. 13F the screws in the front half of the tool were set to the medium position 86$m$ and the screws in the rear half of the tool were set to the low position 86*l*, and the measurements at positions P5 and P6 yielded the measurement curves C5 and C6, respectively.

As may be deduced from the results, setting the position of the screw or screws 86 that correspond to a given measurement position to the medium position 86*m* leads to a greater heating rate (i.e., a greater increase in temperature per unit time=slope of the corresponding measurement curve) and a greater maximal temperature compared to setting the screw or screws 86 to the low position 86*l*. Further setting at least one of the screws 86 to a high position, or removing a screw or screws 86 completely, will further alter the heating rate/maximal temperature in accordance with this principle (e.g., the higher the screw position in z-direction, the greater the heating rate and maximal temperature, given a constant setting of the energy source).

The maximal temperature achieved in the experiment shown and discussed in relation to FIG. 13E, namely approximately 135° C. at positions P1 and P2 (s. curves C1 and C2) and approximately 115° C. at positions P3 and P4 (s. curves C3 and C4), as well as the maximal temperature achieved in the experiment shown and discussed in relation to FIG. 13*f*, namely approximately 145° C. at position P5 (s. curve C5) and approximately 125° C. at position P6 (s. curve C6), were all tailored to the specific material used to perform these experiments, namely particles 29 of expanded thermoplastic polyurethane (eTPU). In other words, the achieved temperatures were set to fall within the processing window of this specific material.

When particles 29 made of, or comprising, a different kind of material are used, the maximal temperature values will generally need to be adjusted to the specific processing characteristics and the available processing window for the material being used. Generally, the maximal temperature for processing any of the materials mentioned herein will not exceed 270° C. For example, by increasing the applied voltage, the achieved maximal temperature values will generally also be increased. Changing the frequency of the applied electromagnetic field, e.g. from 27.12 MHz to 54.20 MHz, will also lead to a change in the achieved maximal temperature (and generally also to the heating rate, for example). As mentioned and discussed above, adjusting the segments/screws 86 to a higher position (i.e., a smaller value of d) will also lead to an increase in the (maximal) temperature at the corresponding position/region within the molding cavity 14, so these factors are interrelated and have to be balanced against each other, as the skilled person understands.

Also, a material having a higher dielectric loss factor will generally heat up quicker and more strongly, so this also needs to be taken into account when exchanging the material and adjusting, e.g., the voltage, frequency and/or position of the segments/screws 86 as well as the duration of the manufacturing process.

Additionally to the above-described possibilities of adjusting the field distribution within the molding cavity 14, the shape of the other capacitor plate, i.e., here the capacitor plate 15 that is connected to the radiation source, can also at least partially be adapted to the geometry of the part that is to be manufactured (i.e., the shoe sole or part of a shoe sole, like a midsole or part thereof). This "conventional and static" approach to adjusting the field distribution can hence supplement the "dynamical" adjustment possibilities provided by the segments 86 with adjustable distance d to the molding cavity 14 disclosed herein.

A fifth aspect of the present invention that goes hand in hand with the fourth aspect and that may also make use of, or rely on any of the options, embodiments and examples disclosed in the context of the first, second and/or third aspect of the present invention, is a method for the manufacture of a shoe sole or part of a shoe sole from foam particles 29.

In an embodiment, the method comprises: a.) loading the particles 29 into a molding cavity 14 of a molding tool 3 which is formed from at least two molding halves 12, 13 which define the molding cavity 14, wherein at least two capacitor plates 15, 16 are arranged adjacent to the molding cavity 14, wherein at least one of the capacitor plates 15 is connected to a radiation source, and wherein at least one of the capacitor plates 16 comprises several segments 86 that have an adaptable distance d to the molding cavity 14; b.) irradiating the molding cavity 14 with electromagnetic radiation emitted by the capacitor plates 15 and 16; and c.) locally adjusting a field strength distribution of the irradiating electromagnetic field within the molding cavity 14 by modifying the adaptable distance d of the segments 86 to the molding cavity 14.

The modifying can occur before and/or during irradiation of the molding cavity 14 with the electromagnetic radiation.

The foam particles 29 can comprise, or be comprised of, at least one of the following base materials: thermoplastic polyurethane (TPU), polylactate(PLA), polyamide (PA), polyether block amide (PEBA), polyethylene terephthalate (PET), polybutylene terephthalate (PBT), and/or thermoplastic polyester ether elastomer (TPEE). As mentioned earlier, these foam particles are particles that comprise a so-called bead foam, also known in the art as a pellet/particle foam. Often the foams derived from the use of connected foam particles are given the designation "e" to denote the bead form of the polymer foam component, for example, eTPU.

To conclude, from the above discussion of the different options, modifications and embodiments that are possible within the scope of the present disclosure regarding the apparatus 1 of FIGS. 13A-F, the skilled person understands how these options, modifications and embodiments translate to corresponding steps for a method of operating such an apparatus 1 to manufacture a particle foam part, in particular a shoe sole or part of a shoe sole from the foam particles 29. To avoid unnecessary repetitions, reference is therefore made to the explanations above.

REFERENCE LIST

1 Apparatus
2 Material container
3 Molding tool
4 Conveying line
5 Base
6 Compressed air line
7 Compressed air source
8 Propelling nozzle
9 Compressed air line
10 Filling injector
11 Compressed air line
12 Molding half
13 Molding half
14 Molding cavity
15 1st capacitor plate
16 2nd capacitor plate
17 Electrical connection line
18 Generator/AC voltage source
19 Limiting surface (inside) of the molding half
20 Fans 21 Outside surface of the molding half
24 Base body
28 Insulating coating
29 Foam particles
30 Ground potential
31 Base wall
32 Circumferential side wall
33 Filling opening
34 Boundary wall
35 Partition
36 Cavity
37 Cover element
38 Protruding part
40 Resonant circuit
41 Switching device
46 Connection line
47 Generator-sided inductance
48 Tool-sided inductance
49 Tool-sided capacitor
50 Tool resonant circuit
21 Generator-sided capacitor
52 Generator resonant circuit
53 Measuring capacitor
54 Coaxial line
55 Voltage measuring device
56 Diode
57 Control device
58 Inductance
59 Isolating capacitor
73 Press
76 Cylinder-piston unit
80, 81 Insulator
82 Screws
83 Electrical connection elements
85, 86 Segments/Tool capacitor/Screws
86a Segment/Screw
d Distance to the molding cavity
D Distance to the opposite capacitor plate
86h Segment/Screw in a high position
86m Segment/Screw in a medium position
86l Segment/Screw in a low position
86x Segment/Screw removed completely
87 Generator connection segment/First capacitor plate segment
88 Marginal segments
89 Central segment
90 Capacitor plate set
91 Additional segment
100 Electrode main body
110 Cover sheet
120 Raising block
130 Grid
p1-p4 Reference positions
P1-P6 Measurement positions/regions
C1-C6 Measurement curves In the following, further examples are described to facilitate the understanding of the invention:

Example 1. Apparatus for producing a particle foam part, in particular a shoe sole or a midsole or a part thereof, comprising:
  a molding tool (3) which defines a molding cavity (14), wherein at least two capacitor plates (15, 16) are arranged adjacent to the molding cavity (14), wherein the capacitor plates are connected to a radiation source (18) for electromagnetic radiation, wherein the radiation source (18) for electromagnetic radiation is designed to emit electromagnetic radiation, and the molding tool (3) is formed from at least two molding halves (12, 13),
  wherein at least one of the two capacitor plates (15, 16) is formed from several segments (85, 86), so that the surface of the capacitor plate (15, 16) may be adapted to the size of the molding tool (3).

Example 2. Apparatus according to example 1, wherein the segments (85, 86) of the capacitor plate or plates (15, 16) are detachably electrically and mechanically connected to one another.

Example 3. Apparatus according to example 1 or 2, comprising an electrically conductive connecting element (83) which electrically connects two or more segments (85, 86) to one another at their edges.

Example 4. Apparatus according to one of the preceding examples, wherein the segments (85, 86) have portions (88) at their edges which interlock when the segments (85, 86) are joined together.

Example 5. Apparatus according to one of the preceding examples, wherein the segments (85, 86) are detachably attached to an insulator (80, 81).

Example 6. Apparatus according to one of the preceding examples, wherein at least one segment (87) of the capacitor plate or plates (15, 16) that are formed by the segments (85, 86) is electrically connected to the radiation source (18).

Example 7. Apparatus according to example 1, wherein the segments (85, 86) of the capacitor plate or plates (15, 16) are permanently attached to an insulator (80, 81) and may be individually switched on or off to adjust the size of the capacitor plate (15, 16).

Example 8. Apparatus according to example 7, wherein the individual segments (85, 86) are electrically insulated from one another and are each separately connected to the radiation source (18) via a high-frequency line (17).

Example 9. Apparatus according to example 7 or 8, wherein the segments (85, 86) are each connected to a resonant circuit (40) which comprises two resonant circuits (50, 52), at least one of the two resonant circuits (50, 52) being tunable so that the radiation supply may be adjusted by tuning the tunable resonant circuit.

Example 10. Apparatus according to one of the preceding examples, wherein the segments (85, 86) together form a contoured capacitor plate (15, 16).

Example 11. Apparatus according to one of the preceding examples, wherein the segments (85, 86) are arranged only on one side of the molding cavity (14) and form a capacitor plate (15, 16) there, and/or a molding half is electrically conductive and serves as a capacitor plate.

Example 12. Apparatus according to any of the preceding examples, wherein at least one of the capacitor plates (15) formed by the segments (85, 86) is electrically connected to the radiation source (18), while the other capacitor plate (15) or its segments (86) are electrically grounded.

Example 13. Apparatus according to one of the preceding examples, wherein the segments (85, 86) each have a geometry which, when the segments (85, 86) are combined, produces a capacitor plate (15, 16) whose geometry is adapted to the geometry of the molding tool (3).

Example 14. Capacitor plate set for an apparatus for producing a particle foam part, in particular for producing a shoe sole or a midsole or a part thereof, comprising:
  at least a first capacitor plate segment (87) adapted to be attached to an insulator and comprising a terminal portion adapted to be connected to a radiation source (18) for generating electromagnetic radiation; and at least one second capacitor plate segments (85);

wherein the first capacitor plate segment (87) and the second capacitor plate segments (85) are designed to jointly form a capacitor plate (15) whose surface area may be adapted to the size of a molding tool (3) for producing a particle foam part.

Example 15. Capacitor plate set according to example 14, wherein the capacitor plate segment or segments (85, 86) are detachably electrically and mechanically connectable to each other to jointly form the capacitor plate (15, 16).

Example 16. Capacitor plate set according to example 14, wherein the second capacitor plate segment or segments (85) each comprise a terminal area for connection to a radiation source (18) for generating electromagnetic radiation, each capacitor plate segment (85, 87) being designed in such a way that it is electrically insulated from the other capacitor plate segment or segments (85, 87) in the capacitor plate (15) formed therefrom and may be switched on or off by a tunable resonant circuit (40).

Example 17. Capacitor plate set according to any one of the examples 14 to 16, wherein the capacitor plate set is adapted for use in an apparatus according to any one of the examples 1 to 13.

Example 18. A method of making a particle foam part, in particular a shoe sole or a midsole or a part thereof, comprising the steps of:
 a. filling foam particles (29) into a molding cavity (14) of a molding tool (3), wherein at least two capacitor plates (15, 16) are arranged adjacent to the molding cavity (14), which are electrically connected to a radiation source (18) for electromagnetic radiation in order to generate electromagnetic radiation;
 b. welding of the foam particles (29) by the electromagnetic radiation between the capacitor plates (15, 16); and
 c. demold the particle foam part; wherein
 d. at least one of the two capacitor plates (15, 16) is formed from a plurality of segments (85, 86), the area of the capacitor plate (15, 16) being adapted to the size of the molding tool (3) by combining the radiation-generating segments (85, 86).

Example 19. Method according to example 18, wherein the segments (85, 86) are detachably electrically and mechanically connected to each other to combine them.

Example 20. Method according to example 18, wherein the segments (85, 86) are arranged electrically insulated from each other and are switched on and off by tuning an resonant circuit (40) connected to the segment (85, 86) in order to combine them with each other.

Example 21. Method according to example 20, wherein the voltage applied to an individual pairs of segments (85, 86) is measured individually and the power supplied to the respective pair of segments (85, 86) is regulated individually in dependence on the measured voltage.

Example 22. Method according to one of the examples 18 to 20, wherein an apparatus according to one of the examples 1 to 14 and/or a capacitor plate set according to one of the examples 15 to 17 is used.

Example 23. An apparatus (1) for the manufacture of a shoe sole or part of a shoe sole from foam particles (29), wherein the apparatus comprises: a molding tool (3) which is formed from at least two molding halves (12, 13) and which defines a molding cavity (14); at least two capacitor plates (15, 16) which are arranged adjacent to the molding cavity; wherein at least one of the capacitor plates is connected to a radiation source; and wherein at least one of the capacitor plates comprises several segments (86) that have an adaptable distance (d) to the molding cavity.

Example 24. Apparatus according to example 23, wherein the segments are electrically connected to an electrically conductive electrode main body (100).

Example 25. Apparatus according to example 23 or 24, wherein the electrode main body is on ground potential.

Example 26. Apparatus according to one of examples 23 to 25, wherein the capacitor plate that is connected to the radiation source is a first capacitor plate on one side of the molding cavity, and wherein the capacitor plate that comprises the several segments that have an adaptable distance to the molding cavity is a second capacitor plate on an opposite side of the molding cavity.

Example 27. Apparatus according to one of examples 23-26, wherein the distance of the segments to the molding cavity may be individually adjusted by mechanical and/or electrical actuator means.

Example 28. Apparatus according to one of examples 23-27, wherein the segments are arranged in a two-dimensional grid (130), in particular in a rectangular grid.

Example 29. Apparatus according to example 28, wherein the grid density varies locally.

Example 30. Apparatus according to one of examples 24-29, wherein the segments are provided as screws or pins adjustably connected to the electrode main body.

Example 31. Apparatus according to example 30, wherein the screws are metal screws that are screwed into the electrode main body, and wherein the electrode main body is made from metal or comprises metal.

Example 32. Apparatus according to examples 30 or 31, further comprising a cover sheet (110) of electrically non-conductive material which is arranged on the electrode main body and comprises openings in which the screws or pins are arranged.

Example 33. Apparatus according to example 32, wherein the cover sheet is made from or comprises an electrically insulating cover, preferably wherein the cover sheet is made from or comprises at least one of the following materials: polytetrafluoroethylene, PTFE; polyethylene, PE, especially ultra-high molecular weight polyethylene, UHMWPE; polyether ketone, PEEK; a thermoplast; a duroplast; polyethylene terephthalate, PET; polyoxymethylene, POM; polystyrene, PS; an insulating mineral material.

Example 34. Apparatus according to one of the preceding examples 23-33, wherein each of the segments may be set to one of at least the following four positions: removed (86x) or electrically disconnected, a low position (86l), a medium position (86m), a high position (86h).

Example 35. Apparatus according to one of the preceding examples 23-34, wherein the position of the segments may be adjusted while the molding cavity is irradiated with electromagnetic radiation.

Example 36. Apparatus according to one of the preceding examples 23-35, wherein adjusting the position of at least one of the segments influences the field strength distribution of the radiated electromagnetic field within the molding cavity.

Example 37. Apparatus according to one of the preceding examples 23-36, wherein the shape of the capacitor plate that is connected to the radiation source is at least partially adapted to the geometry of the part that is to be manufactured.

Example 38. Method for the manufacture of a shoe sole or part of a shoe sole from foam particles (29), the method comprising: loading the particles into a molding cavity (14) of a molding tool (3) which is formed from at least two molding halves (12, 13) which define the molding cavity, wherein at least two capacitor plates (15, 16) are arranged adjacent to the molding cavity, wherein at least one of the capacitor plates is connected to a radiation source, and wherein at least one of the capacitor plates comprises several segments (86) that have an adaptable distance (d) to the molding cavity; irradiating the molding cavity with electromagnetic radiation emitted by the capacitor plates; and locally adjusting a field strength distribution of the irradiating electromagnetic field within the molding cavity by modifying the adaptable distance of the segments to the molding cavity.

Example 39. Method according to example 38, wherein the modifying occurs before and/or during irradiation of the molding cavity with the electromagnetic radiation.

Example 40. Method according to example 38 or 39, wherein the foam particles comprise at least one of the following base materials: thermoplastic polyurethane, TPU; polylactate, PLA; polyamide, PA; polyether block amide, PEBA; polyethylene terephthalate, PET; polybutylene terephthalate, PBT; thermoplastic polyester ether elastomer, TPEE.

That which is claimed is:

1. An apparatus for the manufacture of a shoe sole or part of a shoe sole from foam particles, wherein the apparatus comprises:
    a molding tool formed from at least two molding halves which defines a molding cavity;
    at least two capacitor plates arranged adjacent to the molding cavity; and
    an electrically conductive element;
    wherein at least one of the capacitor plates is connected to a radiation source;
    wherein at least one of the capacitor plates comprises several segments having an adjustable distance to the molding cavity; and
    and
    wherein the several segments are electrically insulated from each other and are switched on and off by tuning a resonant circuit connected to the several segments.

2. The apparatus according to claim 1, wherein the segments are electrically connected to an electrically conductive electrode main body.

3. The apparatus according to claim 2, wherein the electrically conductive main body is on ground potential.

4. The apparatus according to claim 2, wherein the segments are provided as screws or pins adjustably connected to the electrically conductive main body.

5. The apparatus according to claim 4, wherein the screws are metal screws that are screwed into the electrically conductive main body, and wherein the electrically conductive main body is made from metal or comprises metal.

6. The apparatus according to claim 4, further comprising a cover sheet of electrically non-conductive material which is arranged on the electrically conductive main body and comprises openings in which the screws or pins are arranged.

7. The apparatus according to claim 6, wherein the cover sheet is made from or comprises an electrically insulating cover.

8. The apparatus according to claim 6, wherein the cover sheet is made from or comprises at least one of the following materials: polytetrafluoroethylene, PTFE; polyethylene, PE, especially ultra-high molecular weight polyethylene, UHMWPE; polyether ketone, PEEK; a thermoplast; a duroplast; polyethylene terephthalate, PET; polyoxymethylene, POM; polystyrene, PS; an insulating mineral material.

9. The apparatus according to claim 2, wherein adjusting the position of at least one of the segments influences a field strength distribution of a radiated electromagnetic field within the molding cavity.

10. The apparatus according to claim 1, wherein the capacitor plate connected to the radiation source is a first capacitor plate on one side of the molding cavity, and wherein the capacitor plate comprising several segments having an adaptable distance to the molding cavity is a second capacitor plate on an opposite side of the molding cavity.

11. The apparatus according to claim 1, wherein the distance of the segments to the molding cavity is individually adjusted by mechanical and/or electrical actuator means.

12. The apparatus according to claim 1, wherein the segments are arranged in a two-dimensional grid.

13. The apparatus according to claim 12, wherein a grid density varies locally.

14. The apparatus according to claim 1, wherein each of the segments is set to one of at least the following four positions: 1) removed or electrically disconnected, 2) a low position, 3) a medium position, or 4) a high position.

15. The apparatus according to claim 1, wherein the position of the segments is adjusted while the molding cavity is irradiated with electromagnetic radiation.

16. Apparatus according to claim 1, wherein a shape of the capacitor plate that is connected to the radiation source is at least partially adapted to a geometry of the part that is to be manufactured.

* * * * *